(12) United States Patent
Okumura et al.

(10) Patent No.: US 7,766,341 B2
(45) Date of Patent: Aug. 3, 2010

(54) SEAL STRUCTURE, FLUID DEVICE, INTEGRATED VALVE, AND SEALING MEMBER

(75) Inventors: Katsuya Okumura, Tokyo (JP); Shoichi Kitagawa, Komaki (JP); Shigenobu Itoh, Komaki (JP); Kazuhiro Sugata, Komaki (JP); Kazuhiro Arakawa, Komaki (JP); Hiroshi Tomita, Komaki (JP)

(73) Assignees: CKD Corporation, Komaki-shi (JP); Octec, Inc., Tokyo (JP)

( * ) Notice: Subject to any disclaimer, the term of this patent is extended or adjusted under 35 U.S.C. 154(b) by 286 days.

(21) Appl. No.: 11/631,156

(22) PCT Filed: Mar. 23, 2005

(86) PCT No.: PCT/JP2005/005215

§ 371 (c)(1),
(2), (4) Date: Jan. 3, 2007

(87) PCT Pub. No.: WO2006/008856

PCT Pub. Date: Jan. 26, 2006

(65) Prior Publication Data

US 2008/0111321 A1    May 15, 2008

(30) Foreign Application Priority Data

Jul. 16, 2004  (JP) .............................. 2004-210242

(51) Int. Cl.
*F16L 17/00*   (2006.01)
*F16J 15/02*   (2006.01)
*H02G 3/22*    (2006.01)

(52) U.S. Cl. ........................ 277/606; 277/608; 277/609; 277/644

(58) Field of Classification Search ................. 277/644, 277/608–609, 626, 643, 606–607
See application file for complete search history.

(56) References Cited

U.S. PATENT DOCUMENTS 2,889,183 A * 6/1959 Peras .......................... 277/437

(Continued)

FOREIGN PATENT DOCUMENTS

JP    50-112652    9/1975

(Continued)

*Primary Examiner*—Vishal Patel
(74) *Attorney, Agent, or Firm*—Oliff & Berridge, PLC

(57) ABSTRACT

A seal structure in which a sealing member 510 fitted in the seal holding part 120 is elastically deformed to hermetically seal a flow passage joining portion. The seal holding part 120 opening on a flow passage side and including a first retaining surface 121, a second retaining surface 122, and a circumferential surface 123. The sealing member 510 includes a first surface 511 in contact with the first retaining surface 121, a second surface 512 in contact with the retaining surface 122, and an inner surface 513 located inside the seal holding part 510 and tapered to have a diameter becoming smaller from the first surface 511 side to the second surface 512 side. An engagement portion 515 engaged in the seal holding part 120 is formed protruding from an outer surface 514 located on the circumferential surface 123 side and on the first surface 511 side. When the sealing member 510 is fitted in the seal holding part 120 while the engagement portion 515 is pressed, the sealing member 510 is placed such that the inner surface 513 on the first surface 511 side protrudes inward and the outer surface 514 is in contact with the circumferential surface 123.

4 Claims, 15 Drawing Sheets

U.S. PATENT DOCUMENTS

| | | | | |
|---|---|---|---|---|
| 2,966,539 A | * | 12/1960 | Sears et al. | 174/47 |
| 3,567,258 A | * | 3/1971 | Scaramucci | 285/334.4 |
| 3,602,532 A | * | 8/1971 | Ehrenberg | 285/364 |
| 3,918,726 A | | 11/1975 | Kramer | |
| 4,078,813 A | * | 3/1978 | Bram | 277/616 |
| 5,058,907 A | * | 10/1991 | Percebois et al. | 277/626 |
| 5,505,464 A | | 4/1996 | McGarvey | |
| 6,224,064 B1 | * | 5/2001 | St. Germain | 277/589 |
| 6,267,414 B1 | * | 7/2001 | Mosse | 285/24 |
| 6,767,017 B2 | * | 7/2004 | Crapart et al. | 277/608 |
| 6,905,144 B2 | * | 6/2005 | Vila | 285/223 |

FOREIGN PATENT DOCUMENTS

| JP | 50-140008 | 11/1975 |
|---|---|---|
| JP | 55-151954 | 11/1980 |
| JP | U 02-085091 | 7/1990 |
| JP | U 05-062791 | 8/1993 |
| JP | A 2004-044775 | 2/2004 |

* cited by examiner

000
SEAL STRUCTURE, FLUID DEVICE, INTEGRATED VALVE, AND SEALING MEMBER

TECHNICAL FIELD

The present invention relates to a seal structure for sealing a joining portion of flow passages through which a liquid such as a chemical solution for semiconductor flows with a sealing member interposed therein and, particularly, to a seal structure capable of preventing a sealing member from causing the generation of a liquid stagnation area.

BACKGROUND ART

In a semiconductor manufacturing apparatus or the like, an integrated valve 1001 is arranged for integration of valves as shown in FIG. 25 for example such that fluid devices 1102 including a pump upstream valve, a liquid stopper valve for cleaning, a pump, a pump downstream valve, a filter, and a valve for air release from the filter are mounted on flow-passage blocks 1101 formed therein with flow passages. When the fluid devices 1102 are mounted to configure such integrated valve 1001, as shown in FIG. 26, a sealing member such an O-ring 1103 is placed in the joining portion of flow passages 1111 and 1112 to prevent liquid leakage. FIG. 27 is an enlarged sectional view showing a sealing part indicated by a broken line D in FIG. 26.

The flow-passage block 1101 and a body 1121 of the fluid device 1102 are formed with the flow passages 1111 and 1112 respectively. In a portion joining both flow passages, a seal holding part 1130 having a space for receiving the O-ring 1103 is formed. This O-ring 1103 is placed between the flow-passage block 1101 and the fluid device 1102 connected thereto. The O-ring 1103 is made of a rubber material and initially has a circular section as shown by a broken line in FIG. 27, but it is deformed by pressing as illustrated, coming into close contact with the flow-passage block 1101 and a body 1121 of the fluid device 1102. Thus, this hermetically seals the flow passage joining portion to prevent the flowing liquid from leaking out.

[Patent Document 1] U.S. Pat. No. 5,505,464, specification

DISCLOSURE OF INVENTION

Problems to be Solved by the Invention

However, simply placing the O-ring 1103 may generate an entrance space between the O-ring 1103 and the flow-passage block 1101 or the body 1121 of the fluid device 1102 as shown in FIG. 27. This would cause the liquid to stagnate therein, resulting in a stagnation area 1150 in which the liquid is likely to accumulate. In case such stagnation area 1150 is formed in the flow passage, there is a problem that for example a resist solution supplied to flow would accumulate in the stagnation area 1150 and then adhere thereto.

The present invention has been made to solve the above problems and has a purpose to provide a seal structure, a fluid device, an integrated valve, and a sealing member, which are adapted to prevent the sealing member from forming a stagnation area in a sealing portion.

Means for Solving the Problems

The seal structure of the present invention has the following configurations to achieve the above objects.

(1) A seal structure comprising an annular seal holding part formed in a joining portion of flow passages in fluid members connected at open ends thereof, and a sealing member held in an elastically deformed state between the fluid members and fitted in the seal holding part to hermetically seal the flow passage joining portion, is characterized in that the seal holding part is formed to open inwardly into the flow passage and include an upper retaining surface and a lower retaining surface, and the sealing member includes an upper surface and a lower surface which are pressed against the upper retaining surface and the lower retaining surface of the seal holding part respectively, and an inner surface located inside the open seal holding part and curved radially outwardly.

(2) In the invention set forth in (1), it is characterized in that the sealing member is arranged such that the inner surface is curved to form a sharp angle with the upper surface and the lower surface, and a sharply-angled end formed by the inner surface and the upper surface and a sharply-angled end formed by the inner surface and the lower surface are located at ends of the upper retaining surface and the lower retaining surface of the seal holding part on a flow passage surface side when the sealing member is fitted in the seal holding part.

(3) In the invention set forth in (1) or (2), it is characterized in that
the upper surface and the lower surface of the sealing member are partly formed with cutouts so that the upper surface and the lower surface are partly in contact with the upper retaining surface and the lower retaining surface of the seal holding part, and the upper surface and the lower surface are different in contact area.

(4) In any one of the inventions set forth in (1) to (3), it is characterized that the seal holding part includes the upper retaining surface, the lower retaining surface, and a circumferential surface and has a rectangular section, the sealing member is formed with a stepped portion on an outer surface placed in contact with the circumferential surface, at a position corresponding to mating surfaces of the fluid members, and the stepped portion is formed so that one of the upper surface and the lower surface, which has a larger contact area with respect to the upper retaining surface and the lower retaining surface of the seal holding part, protrudes to strongly press against the circumferential surface.

(5) In any one of the inventions set forth in (1) to (4), it is characterized that the sealing member includes a cutout formed in one of the upper surface and the lower surface having the larger contact area with respect to the upper retaining surface and the lower retaining surface of the seal holding part, the cutout being provided in the form of a deep groove.

(6) In any one of the inventions set forth in (1) to (5), it is characterized that the seal holding part is formed with a rough contact plane as one of the upper retaining surface and the lower retaining surface.

(7) A seal structure comprising an annular seal holding part formed in a joining portion of flow passages in fluid members connected at open ends thereof, and a sealing member held in an elastically deformed state between the fluid members and fitted in the seal holding part to hermetically seal the flow passage joining portion, is characterized in that the sealing member is of a circular section, the seal holding part formed to open into the flow passage and include an upper retaining surface, a lower retaining surface, and a circumference retaining surface, providing a rectangular section, and the upper retaining surface and the lower retaining surface are formed with tapered surfaces so that the upper retaining surface and the lower retaining surface are close to each other on the flow passage side.

(8) A seal structure comprising a first flow-passage block formed with a first flow passage and a first seal holding recess in which a sealing member is received around the first flow passage, and a second flow-passage block formed with a second flow passage and a second seal holding recess in which the sealing member is received around the second flow passage, the first and second flow-passage blocks joining the first and second flow passages, is characterized in that the sealing member fitted in the first and second seal holding recesses comprises a resinous core part and a rubber part formed on an inner circumference of the core part by insert molding.

(9) In the invention set forth in (8), it is characterized that the core part includes a central support portion which supports a central part of the rubber part.

(10) In the invention set forth in (8) or (10), it is characterized that
the core part outer-circumferentially includes an outer-circumferential positioning portion which engages with the first and second seal holding recesses to align the first flow passage and the second flow passage.

(11) In any one of the inventions set forth in (8) to (10), it is characterized that the rubber part outer-circumferentially includes an engagement portion which is elastically deformed and engaged in one of the first seal holding recess and the second seal holding recess.

(12) In any one of the inventions set forth in (8) to (9), it is characterized that the core part outer-circumferentially includes an engagement portion which is pressure fitted and engaged in one of the first seal holding recess and the second seal holding recess.

(13) In the invention set forth in (11) or (12), it is characterized that the engagement portion is provided with a slit.

(14) A seal structure comprising an annular seal holding part formed in a joining portion of flow passages in fluid members connected at open ends thereof, and a sealing member held in an elastically deformed state between the fluid members and fitted in the seal holding part to hermetically seal the flow passage joining portion, is characterized in that the seal holding part which inwardly opens into the flow passage and includes a first retaining surface and a second retaining surface, the sealing member includes an annular rubber part located at an end of the seal holding part on a flow passage side when the sealing member is fitted in a sealing state between the first retaining surface and the second retaining surface, and a resinous core part integrally formed around the rubber part.

(15) A seal structure comprising an annular seal holding part formed in a joining portion of flow passages in fluid members connected at open ends thereof, and a sealing member held in an elastically deformed state between the fluid members and fitted in the seal holding part to hermetically seal the flow passage joining portion, is characterized in that the seal holding part which inwardly opens into the flow passage and include a first retaining surface, a second retaining surface and a circumference retaining surface, the sealing member includes a first surface in contact with the first retaining surface, a second surface in contact with the second retaining surface, an inner surface located inside the seal holding part and tapered to have a diameter becoming smaller from the first surface side to the second surface side, and an engagement portion protruding from an outer surface located on the circumference retaining surface side and closer to the first surface to engage with the seal holding part, and the sealing member is fitted in the seal holding part so that the engagement portion is pressed, inwardly pressing the inner surface on the first surface side to bring the outer surface in contact with the circumference retaining surface.

(16) In the invention set forth in (15), it is characterized that the sealing member is arranged such that ends of the first surface and the second surface on the inner surface side are outermost in an axial direction, and are located at ends of the upper retaining surface and the lower retaining surface on a flow passage surface side when the sealing member is fitted in a sealing state in the seal holding part.

(17) In the invention set forth in (15) or (16), it is characterized that the sealing member is arranged such that the first surface and the second surface each include a sealing surface of one of a flat, tapered, and curved forms, thereby sealing with respect to the first retaining surface and the second retaining surface.

(18) In any one of the inventions set forth in (15) to (17), it is characterized that the sealing member is provided with a slit in the engagement portion.

The fluid device of the present invention has the following structure to achieve the above purposes.

(19) It includes the seal structure set forth in any one of (1) to (18).

The integrated of the invention has the following structure to achieve the above purposes.

(20) It includes the seal structure set forth in any one of (1) to (18).

The sealing member of the present invention has the following structure to achieve the above purposes.

(21) A sealing member which seals a first flow-passage block formed with a first flow passage and a first seal holding recess in which a sealing member is received around the first flow passage, and a second flow-passage block formed with a second flow passage and a second seal holding recess in which the sealing member is received around the second flow passage, the first and second flow-passage blocks joining the first and second flow passages, is characterized in that the sealing member comprises a resinous core part and a rubber part formed on an inner circumference of the core part by insert molding.

(22) In the invention set forth in (21), it is characterized that the core part includes a central support portion which supports a central part of the rubber part.

(23) In the invention set forth in (21) or (22), it is characterized that the rubber part outer-circumferentially includes an engagement portion which can be elastically deformed and engaged in one of the first seal holding recess and the second seal holding recess.

(24) In the invention set forth in (21) or (22), it is characterized that the core part outer-circumferentially includes an engagement portion which can be pressure fitted and engaged in one of the first seal holding recess and the second seal holding recess.

(25) A sealing member which is elastically deformable to be fitted in an annular seal holding part formed to open into a flow passage in a flow passage joining portion and which hermetically seals the flow passage joining portion, is characterized in that the sealing member comprises an annular rubber part located at an end of the seal holding part on a flow passage side and a resinous core part integrally formed around the rubber part.

(26) A sealing member which is elastically deformable to be fitted in an annular seal holding part formed to open into a flow passage in a flow passage joining portion and which hermetically seals the flow passage joining portion, is characterized in that the sealing member comprises a first surface and a second surface forming sealing surfaces which can be brought in contact with the seal holding part, and an inner surface joining inner edges of the first surface and the second surface, the inner surface being formed with a taper to have a diameter becoming smaller from the first surface to the second surface, and an outer surface joining outer edges of the first surface and the second surface is formed with an engagement portion protruding close to the first surface.

(27) In the invention set forth in (26), it is characterized that the taper has an inclination width determined to be almost equal to a protruding width of the engagement portion.

(28) In the invention set forth in (26) or (27), it is characterized that ends of the first surface and the second surface on an inner surface side are outermost in an axial direction.

(29) In any one of the inventions set forth in (26) to (28), it is characterized that the first surface and the second surface each include a sealing surface of one of a flat, tapered, and curved forms, which extends from the end on the inner surface side to a predetermined position.

EFFECTS OF THE INVENTION

The seal structure of the present invention incorporates the sealing member as a constituent component and is characterized in the shape or the like of the sealing member. In the seal structure provided with the sealing member, the shape or the like of the sealing member could not be identified unless flow-passage components and others are disassembled. Accordingly, applicants herein request to also obtain a patent right about the sealing member as well as the seal structure. Thus, the sealing member is of substantially the same operations and effects as the seal structure. This is a premise of the following description on the operations and effects of the present invention.

It should be noted that the sealing member is a member for sealing a flow passage joining portion and includes elastic-deformable members such as a rubber packing and a rubber gasket and plastic-deformable members such as a resinous or metallic packing and a resinous or metallic gasket.

The present invention is arranged such that the seal holding part is formed to open inwardly into the flow passage and include an upper retaining surface and a lower retaining surface, and the sealing member includes an upper surface and a lower surface which are pressed against the upper retaining surface and the lower retaining surface of the seal holding part respectively, and an inner surface located inside the open seal holding part and curved radially outwardly.

Accordingly, even when deformed by vertical pressing, the sealing member being recessed outward will not protrude into the flow passage. The inner surface of the sealing member closes an open area between the upper retaining surface and the lower retaining surface of the seal holding part, preventing generation of a gap between the sealing member and the upper and lower retaining surfaces of the seal holding part. This makes it possible to provide the seal structure capable of preventing the generation of a stagnation area in the sealing part by the sealing member.

Further, the present invention is arranged such that the sealing member is arranged such that the inner surface is curved to form a sharp angle with the upper surface and the lower surface, and a sharply-angled end formed by the inner surface and the upper surface and a sharply-angled end formed by the inner surface and the lower surface are located at ends of the upper retaining surface and the lower retaining surface of the seal holding part on a flow passage surface side when the sealing member is fitted in the seal holding part.

Accordingly, the liquid is allowed to flow smoothly across a continuous area of the inner surface of the sealing member with the upper and lower retaining surfaces of the seal holding part, which makes stagnation is unlikely to occur.

Further, the present invention is arranged such that the upper surface and the lower surface of the sealing member are partly formed with cutouts so that the upper surface and the lower surface are partly in contact with the upper retaining surface and the lower retaining surface of the seal holding part, and the upper surface and the lower surface are different in contact area.

Accordingly, the sealing member is held by adsorption to one having the larger contact area. This makes it possible to prevent the sealing member from dropping off or being left unattached.

In the present invention, further, the sealing member is of a circular section, the seal holding part formed to open into the flow passage and include an upper retaining surface, a lower retaining surface, and a circumference retaining surface, providing a rectangular section, and the upper retaining surface and the lower retaining surface are formed into a taper so that the upper retaining surface and the lower retaining surface come close to each other on the flow passage side.

Accordingly, the sealing member deformed by vertical pressing is in close contact with the narrowed tapered surface without generating a space in an open end of the seal holding part on the flow passage side. Thus, it is possible to provide the seal structure capable of preventing the generation of a stagnation area in the sealing part by the sealing member.

Meanwhile, in the case where a high-pressure fluid is allowed to flow, a sealing position of a sealing member having the above structure might be displaced. In the seal structure of the present invention, on the other hand, the use of the sealing member provided with a rubber part on the inner circumference of a resinous core part makes it possible to prevent deformation of the rubber part which is firmly retained between the first and second seal holding recesses even if the rubber part is deformed outward upon receiving fluid pressure. Accordingly, the sealing surfaces of the sealing member sealing with respect to the first and second seal holding recesses are unlikely to be displaced and the sealing member can be held stably while retaining the rubber part in a continuous relation with the flow passage surface. The sealing member is integrally made of the rubber part and the core part by insert molding. Thus, an inexpensive sealing member can be produced with dimensional accuracy equivalent to a single component, so that such dimensional accuracy exerts less influence on the sealing surfaces.

According to the seal structure of the present invention, consequently, the core part can restrict outward deformation of the rubber part even under pressure of the fluid, thereby stably holding the sealing member in the first and second seal holding recesses, which makes it possible to enhance the sealing reliability during pressurization.

In particular, the central support portion of the core part of the sealing member supports the substantially central portion of the rubber part. This makes it possible to prevent the rubber part from radially outwardly expanding and becoming deformed, thereby more reliably preventing displacement of the sealing surfaces.

The core part of the sealing member outer circumferentially includes an outer-circumferential positioning portion which engages with the first and second seal holding recesses to align the first flow passage and the second flow passage.

The first flow passage, second flow passage, sealing surfaces of the sealing member, first seal holding recess, second seal holding recess, and the outer-circumferential positioning portion can be made with high accuracy, providing an increased sealing reliability between components. In addition, the first and second flow-passage blocks are aligned by the outer-circumferential positioning portion of the sealing member. This can prevent axial misalignment which causes parts of the sealing surfaces of the sealing member to protrude into the first and second flow passages, leading to a stagnation area and turbulence, and prevent a decrease in sealing area resulting in deterioration of sealing performance.

In the case where the sealing member is arranged such that the rubber part is elastically deformable and provided with an engagement portion which can be engaged in the first holding recess, the sealing member does not drop off from the first seal holding recess when the first and second flow-passage blocks are separated for example, with the result that workability can be improved.

In the case where the sealing member is arranged such that the core part is outer circumferentially provided with an engagement portion which can be pressure fitted and engaged in the first seal holding recess, the sealing member does not drop off from the first seal holding recess when the first and second flow-passage blocks are separated for example, with the result that workability can be improved. In addition, it is possible to reduce the amount of material used for the rubber part as compared with the case where the rubber part is formed with the engagement portion, thus achieving a reduction in cost.

In the case where a slit is provided with the engagement portion, the gaps formed between the sealing member and the first and second seal holding recesses respectively are communicated with each other through the slit. This allows air accumulated in the gaps to release to the outside through the mating surfaces of the first and second flow-passage blocks. Accordingly, air in the air pocket can be prevented from moving to the flow passage side to generate air bubbles in the fluid.

The seal structure using the sealing member provided with the resinous core part around the rubber part has excellent sealing performance, but it has a problem that the material fees and the processing fees are expensive, leading to an increase in cost. On the other hand, as the seal structure of the present invention, it is arranged that the seal holding part which inwardly opens into the flow passage and include a first retaining surface, a second retaining surface and a circumference retaining surface, the sealing member includes a first surface in contact with the first retaining surface, a second surface in contact with the second retaining surface, an inner surface located inside the seal holding part and tapered to have a diameter becoming smaller from the first surface side to the second surface side, and an engagement portion protruding from an outer surface located on the circumference retaining surface side and closer to the first surface to engage with the seal holding part, and the sealing member is fitted in the seal holding part so that the engagement portion is pressed, inwardly pressing the inner surface on the first surface side to bring the outer surface in contact with the circumference retaining surface.

Accordingly, the ends of the first surface and the second surface of the sealing member on the inner surface side seal the open end of the seal holding part, which prevents the fluid from entering between the sealing member and each of the first and second retaining surfaces of the seal holding part, thus avoiding the generation of a stagnation area and an accumulation area. In this seal structure, the pressure acting on the inner surface is supported by contact between the outer surface of the sealing member and the circumferential surface of the seal holding part. This makes it possible to enhance rigidity of the sealing member and prevent displacement of the sealing surfaces even when the inner surface of the sealing member is subjected to the action of a high-pressure fluid. Further, the sealing member being made of a single material can be inexpensive in material cost and processing cost. The seal structure of the present invention using the inexpensive sealing member therefore can develop stable sealing performance and prevent the generation of a stagnation area and an accumulation area.

According to the seal structure of the present invention, the sealing member is arranged such that ends of the first surface and the second surface on the inner surface side are outermost in an axial direction, and are located at ends of the upper retaining surface and the lower retaining surface on a flow passage surface side when the sealing member is fitted in a sealing state in the seal holding part.

Accordingly, the ends of the first and second surfaces on the inner surface side are pressed against the ends of the first and second retaining surfaces of the seal holding part on the open side. This allows a smooth flow of liquid across the seal holding part where the first and second retaining surfaces are contiguous with the inner surface of the sealing member. Therefore stagnation is unlikely to occur.

According to the seal structure of the present invention, the sealing member is arranged such that the first surface and the second surface each include a sealing surface of one of a flat, tapered, and curved forms, thereby sealing with respect to the first retaining surface and the second retaining surface.

When the sealing member on the first surface side is inserted in the seal holding part while the engagement portion is pressed, thereby turning the sealing member on the first surface side to inward move, thereby pressing part of the sealing surface of the first surface against the first retaining surface of the seal holding part. This results in a state where the end of the first surface on the inner surface side is placed in noncontact with the first retaining surface of the seal holding part. When the sealing member on the second surface side is then inserted in the seal holding part until it is fitted in the seal holding part, the ends of the first and second surfaces of the sealing member on the inner surface side can be pressed vertically against the first and second retaining surfaces of the seal holding part. Therefore, the sealing force can be developed efficiently.

In the seal structure of the present invention, furthermore, the sealing member is provided with a slit in the engagement portion. This allows the gap formed between the first surface and the sealing member and the first retaining surface of the seal holding part and the gap formed between the second surface of the sealing member and the second retaining surface of the seal holding part to be communicated with each other through the slit and further communicated with the outside air through the mating surfaces of the flow-passage blocks. It is thus possible to automatically discharge the air in the air pocket formed between the sealing member and the seal holding part, which can prevent the air from moving to the flow passage side and generating air bubbles.

According to the fluid device or integrated valve provided with the seal structure providing the above operations and effects, it is possible to reduce the generation of a stagnation area and an accumulation area of fluid.

EXPLANATION OF REFERENCE CODES

| | |
|---|---|
| 110 | Packing |
| 111 | Upper surface |
| 112 | Lower surface |
| 113 | Outer surface |
| 114 | Inner surface |
| 120 | Seal holding part |
| 121 | Upper retaining surface |
| 122 | Lower retaining surface |

EXPLANATION OF REFERENCE CODES -continued

| | |
|---|---|
| 123 | Circumferential retaining surface |
| 150 | Flow passage |
| 151 | Flow passage surface |
| 301 | Seal structure |
| 302 | First flow-passage block |
| 303 | Second flow-passage block |
| 304 | First flow passage |
| 305 | First gasket recess |
| 306 | Second flow passage |
| 307 | Second gasket recess |
| 310, 410 | Gasket |
| 311, 411 | Core part |
| 312, 412 | Rubber part |
| 313 | Outer-circumferential positioning portion |
| 315 | Central support portion |
| 323, 430 | Engagement portion |
| 325 | Slit |
| 501 | Seal structure |
| 510 | Gasket |
| 511 | Upper surface |
| 511a | Sealing surface |
| 512 | Lower surface |
| 512a | Sealing surface |
| 513 | Inner surface |
| 514 | Outer surface |
| 515 | Engagement portion |
| 516 | Slit |
| 1001 | Integrated valve |
| 1102 | Fluid device |
| 1101 | Flow-passage block |
| 1121 | Body |

BEST MODE FOR CARRYING OUT THE INVENTION

Preferred embodiments of a seal structure according to the present invention will be described below.

First Embodiment

Figure 1:
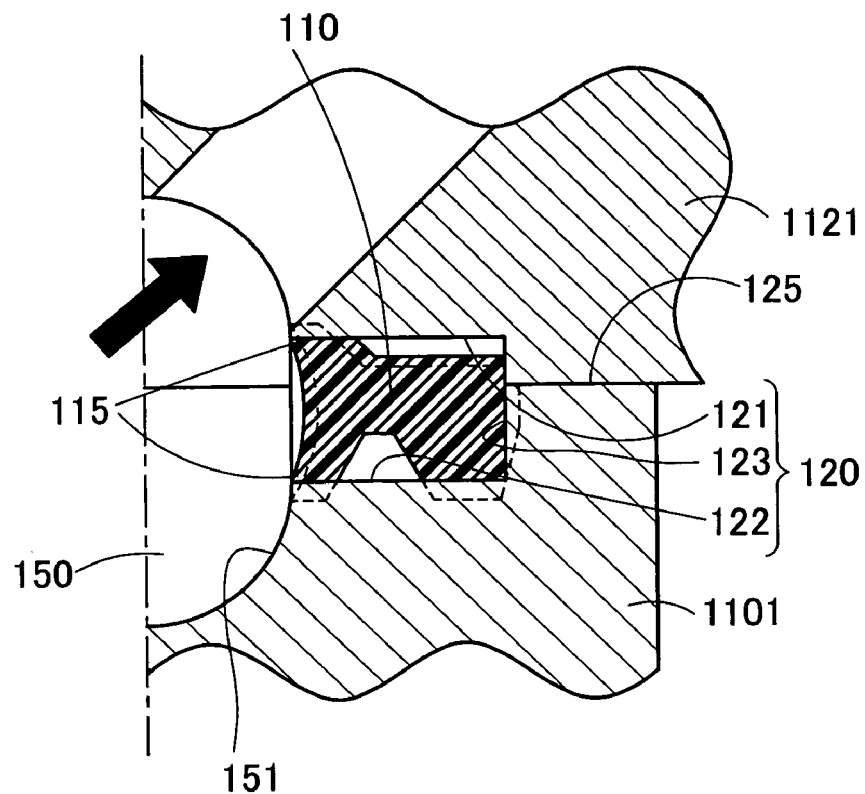
FIG. 1 is a sectional view of a seal structure in a first embodiment, showing a configuration that a sealing member is fitted in a sealing part.

A first embodiment of the present invention will be explained first referring to the drawings. FIG. 1 is a sectional view of the seal structure of the first embodiment, showing a configuration that a ring-shaped packing serving as a sealing member is fitted in a sealing part. This seal structure is provided in the integrated valve 1001 shown in FIG. 25 as in the conventional one. Further, the seal structure is provided in a sealing part when the fluid device 1102 is mounted on the flow-passage block 1101 constituting the integrated valve 1001 as shown in FIG. 26. It is to be noted that the flow-passage block 1101 and the body 1121 of the fluid device 1102 are made of tetrafluoroethylene resin (PFA, PTFE). The packing 110, corresponding to a "sealing member" of the claims, is made of an elastic material (rubber such as perfluoro rubber (FFKM), unburned PTFE (unburned fluorocarbon resin)). In this respect, an O-ring 1103 used in the conventional structure or in a second embodiment is also made of the same rubber (such as FFKM).

Figure 2:
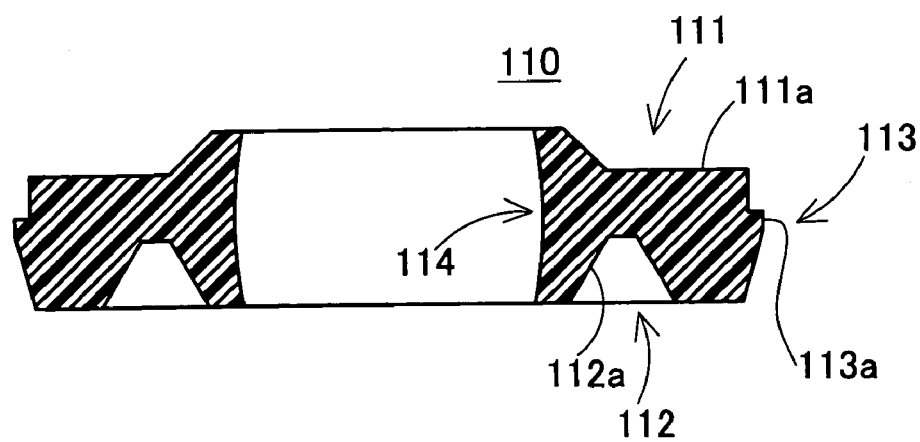
FIG. 2 is a sectional view of a packing constituting the seal structure of the first embodiment.

The seal structure of the present embodiment, which has an identical annular seal holding groove to that of the flow-passage block 1101 and the body 1121 of the fluid device 1102, is characterized in a packing 110. A seal holding part 120 in which the packing 110 is fitted is formed by the seal holding grooves combined with each other to have a rectangular section as shown in FIG. 1. The seal holding part 120 includes an upper retaining surface 121, a lower retaining surface 122, and a circumferential retaining surface 123 formed as an innermost face perpendicular to those parallel surfaces 121 and 122. FIG. 2 is a sectional view of the packing 110 to be fitted in the seal holding part 120.

The packing 110 is formed to have different shaped surfaces; an upper surface 111, a lower surface 112, and an outer surface 113, which are brought in contact with the upper retaining surface 121, the lower retaining surface 122, and the circumferential retaining surface 123 respectively, and an inner surface 114 which faces to a flow passage 150. In FIG. 1 showing a fitted state, the packing 110 deformed by pressing is illustrated by a solid line, and the original shape of the packing 110 shown in FIG. 2 is also illustrated by a broken line. In the seal holding part, the upper retaining surface 121 and the lower retaining surface 122 are equal in area. However, in the packing 110, the lower surface 112 is larger in contact area than the upper surface 111.

The contact areas of the upper surface 111 and the lower surface 112 are adjusted by partly cutting out respective surfaces. The upper surface 111 is formed with a stepped portion 111a by widely cutting out. The lower surface 112 is formed with a groove 112a narrower than the stepped portion 111a. The reason why the upper surface 111 and the lower surface 112 are made different in contact area as above is for example to prevent the packing 110 from being left unattached. To be concrete, if the packing 110 is adsorbed to the body 1121 when demounted from the flow-passage block 1101 during replacement of the fluid device 1102, another fluid device 1102 is likely to be mounted on the flow-passage block 1101 without the packing. In the present embodiment, accordingly, the contact area of the lower surface 112 is larger than the contact area of the upper surface 111 so that the packing 110 is adsorbed to and retained in the flow-passage block 1101 providing the lower retaining surface 122. Further, the upper retaining surface 121 is formed to be so rough as to reduce the adsorptive power to the body 1121.

In the present embodiment, the outer surface 113 is also of a feature to further enhance the adsorbing-holding effect of the packing 110 to the flow-passage block 1101. Specifically, the seal holding part 120 is formed so that the innermost faces of the flow-passage block 1101 and the body 1121 are flush with each other, forming the circumferential retaining surface 123. The outer surface 113 of the packing 110 which is brought in contact with the circumferential retaining surface 123 is formed with a shoulder 113a corresponding to the position of a mating surface 125 between the flow-passage 1101 and the body 1121, thus protruding outward below the mating surface 125, i.e., on the flow-passage block 1101 side. Accordingly, the lower portion of the outer surface 113 to be brought in contact with the flow-passage block 1101 protrudes as illustrated by a broken line in FIG. 1. The upper portion of the outer surface 113 to be brought in contact with the body 1121 is flat along the circumferential retaining surface 123.

When the packing 110 is fitted in the seal holding part 120; the protruding stepped portion 113a is deformed inward (leftward in the figure) by pressing, and fixedly adsorbed as well as the lower surface 112 to the flow-passage block 1101. When the protruding stepped portion 113a is pressed inward as above, meanwhile, it is necessary to absorb the deformation of the packing 110 to prevent the inner surface 114 from protruding from the seal holding part 120 into the flow passage 150. For this end, the groove 112a is deeply formed in the lower surface 112 to prevent the deformation of the outer surface 113 from transmitting to the inner surface 114.

The inner surface 114 facing to the flow passage 150 is formed into an outwardly curved recess. Ideally, the inner surface 114 is flat to be flush with a flow-passage surface 151 of the flow-passage block 1101 forming the flow passage 150. However, it is necessary to prevent the inner surface 114 from protruding from the seal holding part 120 into the flow passage 150 when the packing 110 is deformed by pressing. In case the inner surface 114 protrudes beyond the flow-passage surface 151 into the flow passage 150, a turbulent flow is likely to occur, leading to a large flow quantity loss. In the present embodiment, therefore, the inner surface 114 is smoothly curved so as not to generate a stagnation area in the curved recess, as well as not to become in itself the stagnation area.

The packing 110 is designed to have a sharp angle between the upper surface 111 and the inner surface 114 and between the lower surface 112 and the inner surface 114. In a state where the sharp ends 115 overlap the ends of the upper retaining surface 121 and the lower retaining surface 122 on the flow passage 150 side as shown in the figure, the stagnation area will be least generated. However, the deformed amount and position of the packing 110 slightly vary according to dimensional tolerance and pressing strength. Even in such case, it is necessary to prevent the sharp ends 115 from protruding from the upper retaining surface 121 and the lower retaining surface 122 into the flow passage 150. The inner surface 114 may be designed to have a central curved face and an upper and lower faces perpendicular to the upper retaining surface 121 and the lower retaining surface 122, instead of having an entirely curved face as shown in the figure. In other words, to prevent the generation of stagnation areas, the angle between the upper surface 111 and the inner surface 114 and between the lower surface 112 and the inner surface 114 is preferably within 90 degrees.

When fitted in the seal holding part 120 as shown in FIG. 1, the packing 110 is pressed from above and below by the flow-passage block 1101 and the body 1121 of the fluid device 1102 and also inwardly pressed from outside by the flow-passage block 1101. The packing 110 is thus pressure fitted in the seal holding part 120. In particular, because of the outer surface 113 and the lower surface 112 larger in area than the upper surface 111, the packing 110 is more firmly adsorbed to the flow-passage block 1101. The inner surface 114 formed as a curved recess is made continuous with the flow-passage surface 151 of the flow-passage block 1101 and the body 1121.

In the seal structure of the present embodiment, the packing 110 having the aforementioned section is fitted in the rectangular seal holding part 120, which makes it possible to reduce stagnation of the liquid flowing through the flow passage 150 by the inner surface 114 of the packing 110. This can prevent liquid stagnation and accumulation in the seal holding part 120.

In the seal structure of the present embodiment, the packing 110 is in pressure contact with the flow-passage block 1101 side through the larger area than with respect to the body 1121, which can prevent the packing 110 from becoming adsorbed to the fluid device 1102 or dropping off from the flow-passage block 1101 when the fluid device 1102 is demounted. This makes it possible to prevent the packing 110 from being likely left unattached during replacement of the fluid device 1102 for example.

Further, the integrated valve 1001 and the fluid devices 1102, provided with the seal structure of the present embodiment, can achieve a reduction in generation of fluid stagnation or accumulation.

Second Embodiment

Figure 3:
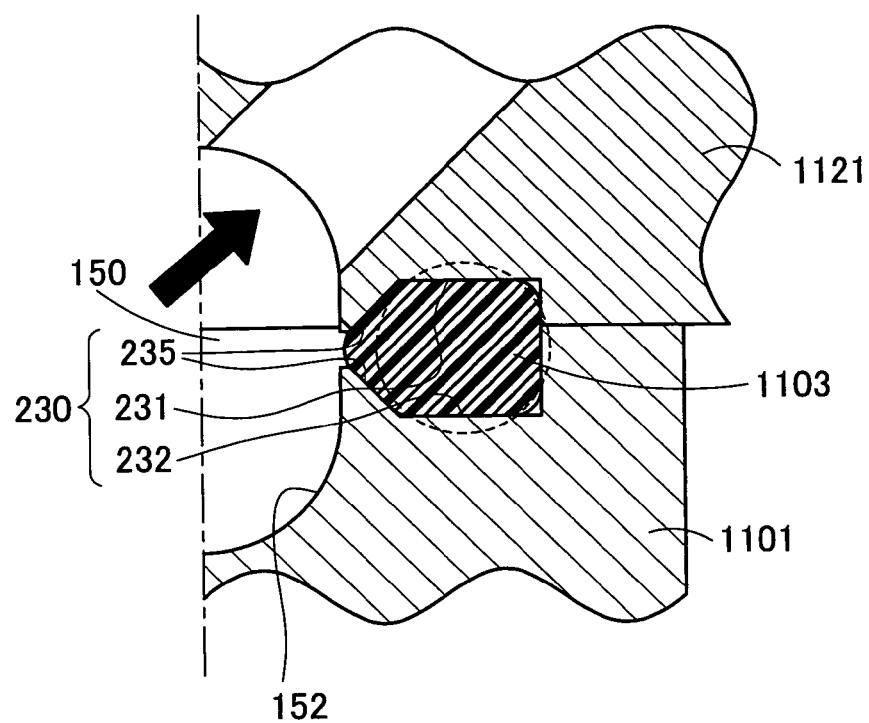
FIG. 3 is a sectional view of a seal structure in a second embodiment, showing a configuration that a sealing member is fitted in a sealing part.

A second embodiment of the present invention will be described with reference to the drawings. FIG. 3 is a sectional view showing a seal structure of the present embodiment. This seal structure is characterized in the use of the O-ring 1103, serving as a sealing member, having a circular section as in the conventional structure and the shape of a seal holding part 230 formed in the flow-passage block 1101 and the body 1121 of the fluid device 1102 to hold the O-ring 1103.

Figure 27:
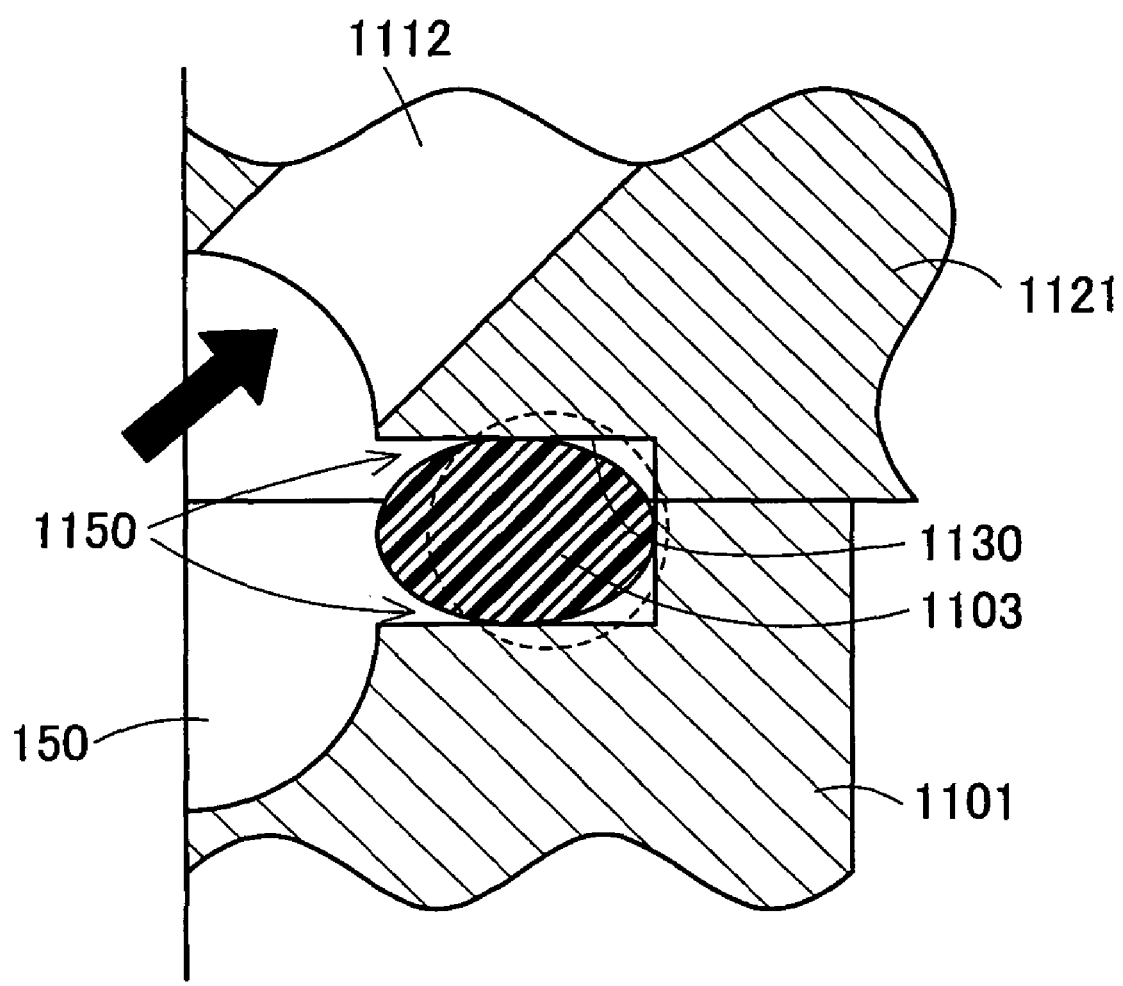
FIG. 27 is an enlarged sectional view of a sealing part indicated by a broken line D in FIG. 26.

When the O-ring 1103 is simply pressed from above and below as is conventionally done, the section thereof becomes elliptical as shown in FIG. 27. If the seal holding part 230 had a wide opening on the flow passage 150 side, it would create a wide space leading to a stagnation area 1150 (see FIG. 27) between the opening on the flow passage 150 side and an edge of the O-ring 1103 elastically deformed in an elliptic shape. To narrow the section of the seal holding part 230 on the flow passage 150 side in association with the elastically deformed shape of the O-ring 1103 vertically pressed, an upper retaining surface 231 and a lower retaining surface 232 in the present embodiment are provided with tapered surfaces 235 in the flow-passage block 1101 and the body 1121 respectively.

The O-ring 1103 is vertically deformed by pressing when fitted between the flow-passage block 1101 and the body 1121. Further, a portion which is not pressed so far as shown in FIG. 27 is pressed by the tapered surfaces 235 to come into close contact therewith. Thus, the O-ring 1103 is in close contact with the tapered surfaces 235 providing a narrow section, thereby preventing creation of a space in the opening of the seal holding part 230 on the flow passage 150 side.

A slight gap between the ends of the tapered surfaces 235 and the O-ring 1103 is a part of the flow passage 150. It is therefore fundamentally preferable to provide a surface flush with the flow-passage surface 152, but the O-ring 1103 would form a small depression due to its circular section. In the seal structure of the present embodiment, however, even if the liquid enters the depression, it will be swept away by the flow of liquid and unlikely to accumulate therein.

Third Embodiment

A third embodiment of the present invention will be described below with reference to the drawings.

A seal structure and a sealing member of the present embodiment correspond to improved ones of the seal structure and the packing 110 of the first embodiment. When the applicants measured the pressure resistance of the seal structure and the packing 110 of the first embodiment, it was revealed that fluid leakage was caused when the fluid pressure rose to for example 0.1 MPa or more. This is conceivably because when the pressure of a high-pressure fluid acts on the inner surface 114 of the packing 110 formed with the stepped portion 111*a* and the groove 112*a*, the packing 110 is deformed radially outwardly to move into the seal holding part 120, causing displacement of the sealing surfaces. Repeatedly pressurizing the inner surface 114 causes repetition of motions of the sealing surfaces in the radially inward and outward directions, thereby pushing the fluid away to the outside of the sealing surfaces, leading to fluid leakage. Motions of the sealing surfaces in the radially outward direction are likely to cause irregularities in the flow-passage surface 151, leading to a stagnation area, which might deteriorate the sealing performance. Hence, the present embodiment has characteristics that a flow-passage seal structure (corresponding to a "seal structure") contains a gasket (corresponding to a "sealing member") 310 formed of a rubber part 312 and a resinous core part integrally surrounding it by molding.

Figure 4:
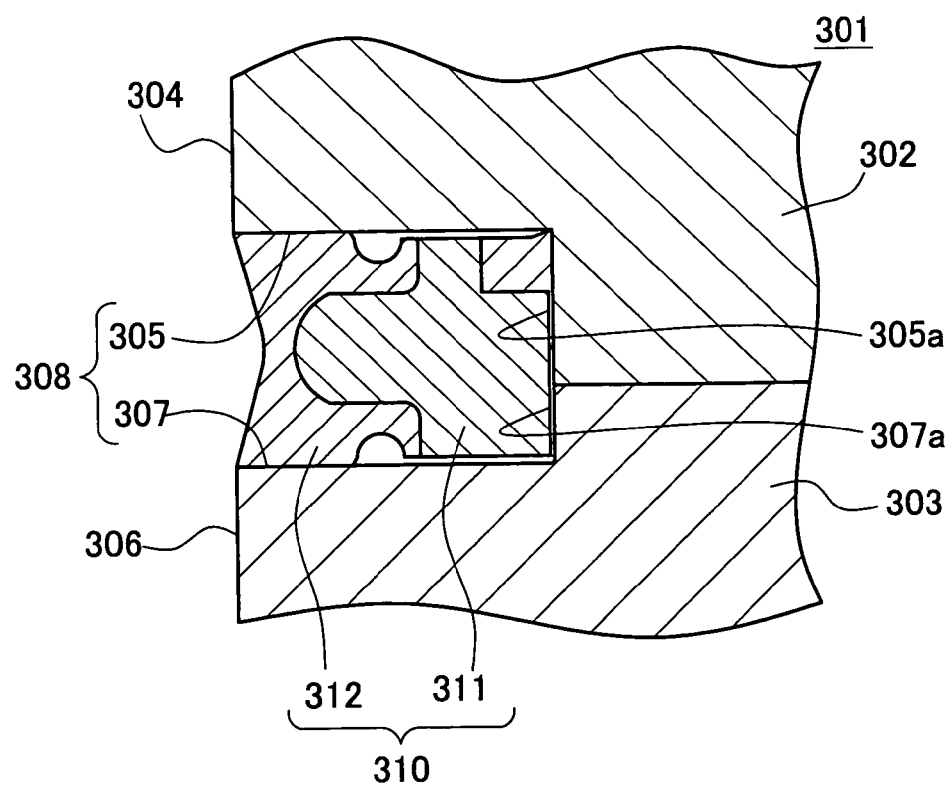
FIG. 4 is a sectional view of a seal structure in a third embodiment, showing a configuration that a sealing member is fitted in a sealing part.

FIG. 4 is a sectional view of the flow-passage seal structure 301 in which the gasket 310 is fitted in a sealing part.

Figure 25:
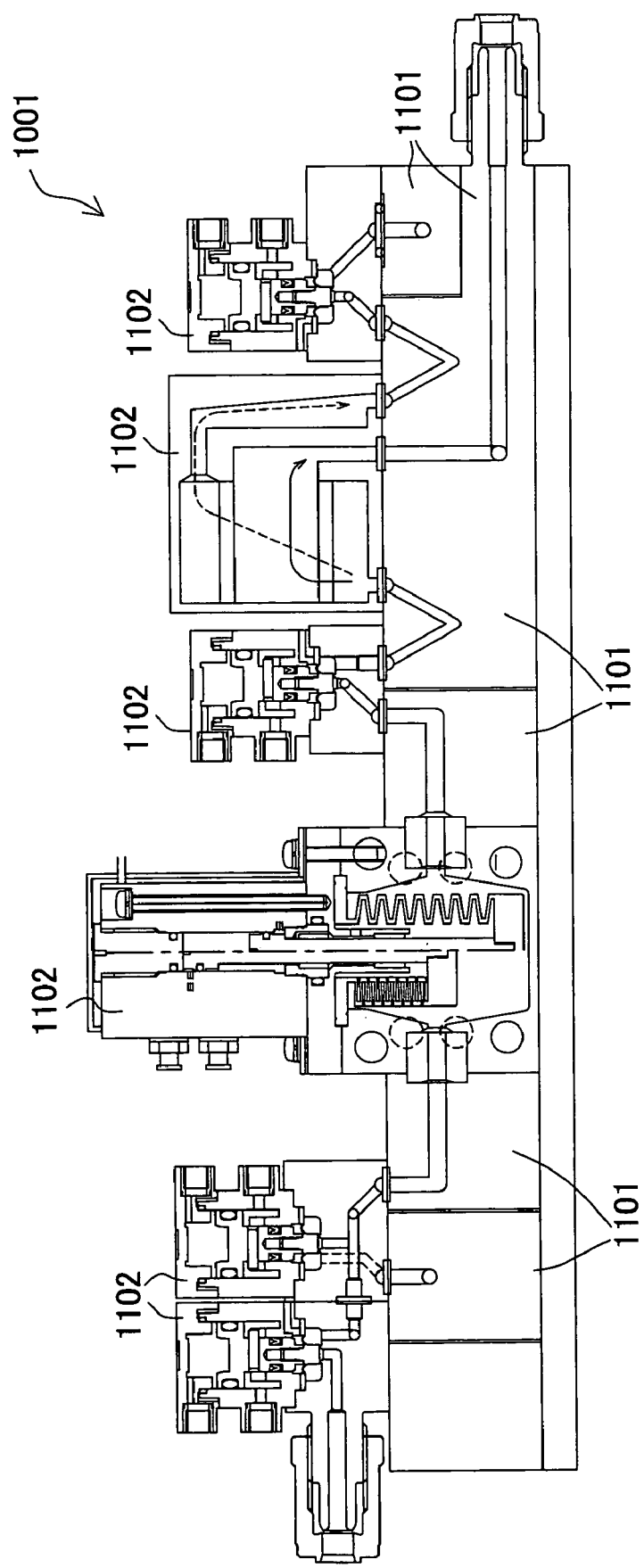
FIG. 25 is a view of an example of an integrated valve to be used in a semiconductor manufacturing device or others.
Figure 26:
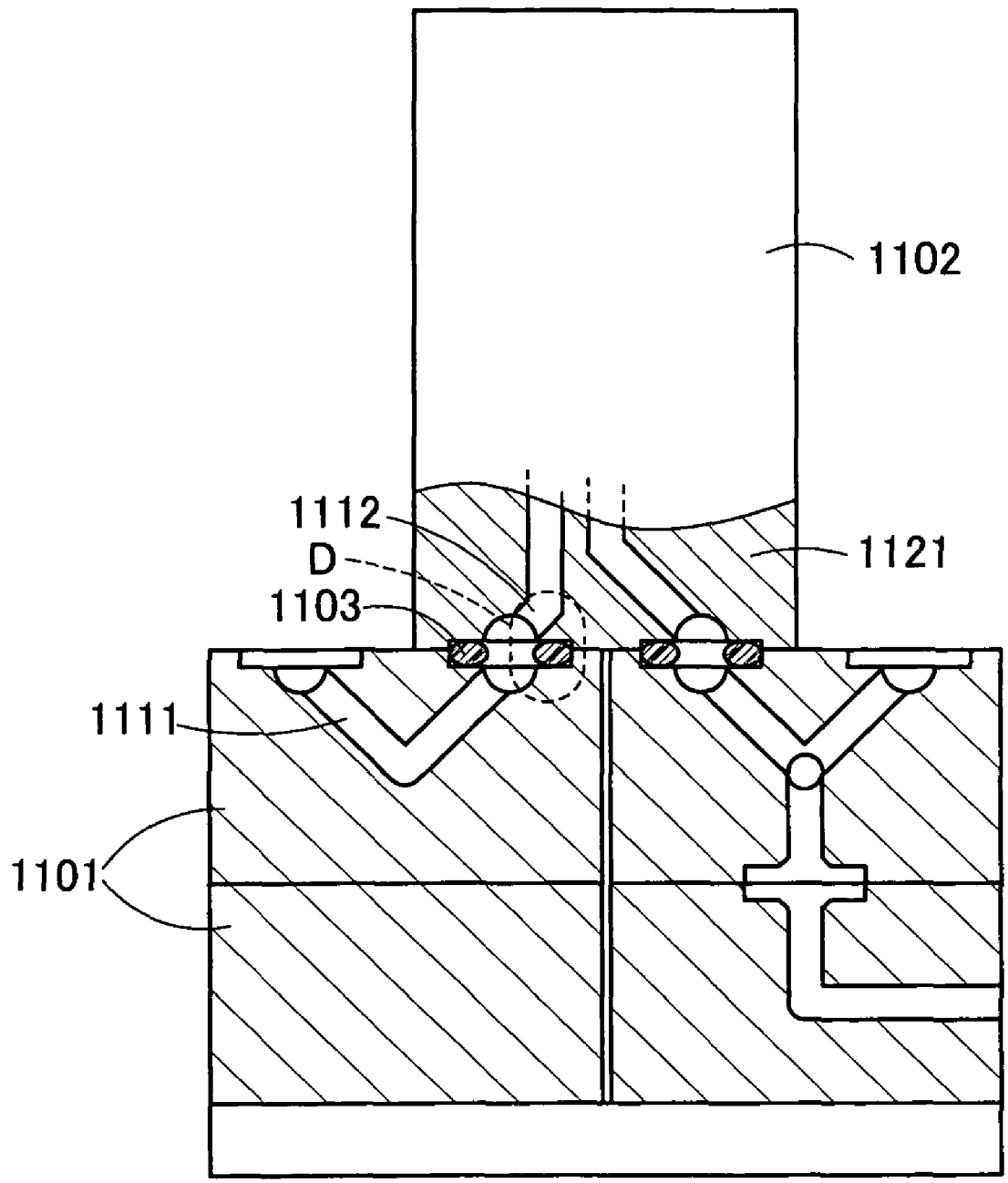
FIG. 26 is a partially sectional view of an integrated valve with a fluid device mounted on a flow-passage block.

The flow-passage seal structure 301 of the present invention will be mounted on the integral valve 1001 shown in FIG. 25 as in the conventional example and further configured as the sealing part in the case where the fluid device 1102 is mounted on the flow-passage block 1101 as shown in FIG. 26. The flow-passage seal structure 301 is arranged such that a first flow-passage block 302, a second flow-passage block 303, and the gasket 310 interposed therebetween, thereby preventing fluid leakage. In the present embodiment, the first flow-passage block 302 corresponds to the body 1121 (see FIG. 26) of the fluid device 1102 and the second flow-passage block 303 corresponds to the flow-passage block 1101 (see FIG. 26).

The first flow-passage block 302 and the second flow-passage block 303 are made of fluorocarbon resin (PFA, PTFE). The first flow-passage block 302 is formed with a first flow passage 304 and circumferentially a first gasket recess (corresponding to a "first seal holding recess" of the claims) 305 which receives the gasket 310. The second flow-passage block 303 is formed with a second flow passage 306 and circumferentially a second gasket recess (corresponding to a "second seal holding recess" of the claims) 307 which receives the gasket 310 and is shallower than the first gasket recess 305. The reason why the second gasket recess 307 is shallower than the first gasket recess 305 is to make it easy to distinguish the fitting direction of the gasket 310. The first gasket recess 305 and the second gasket recess 307 are combined to constitute a seal holding part 308 having a rectangular section opening on one side.

Figure 5:
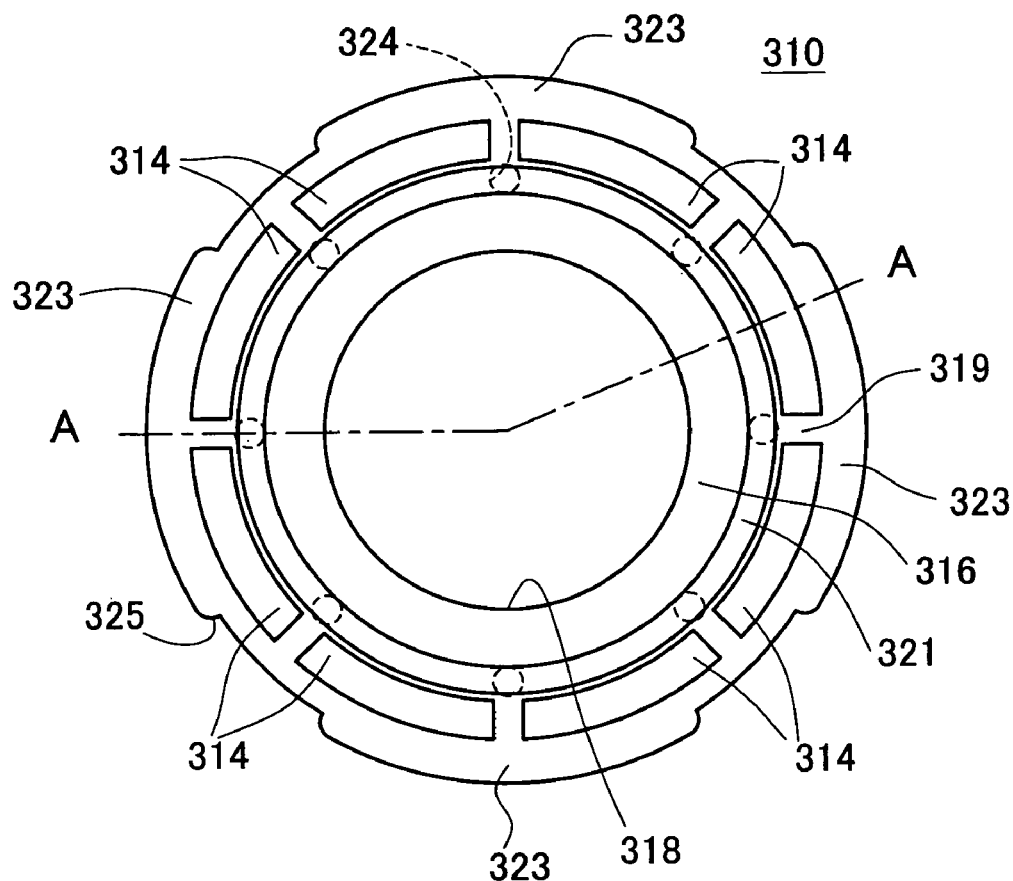
FIG. 5 is a plan view of a gasket constituting the seal structure of the third embodiment.
Figure 6:
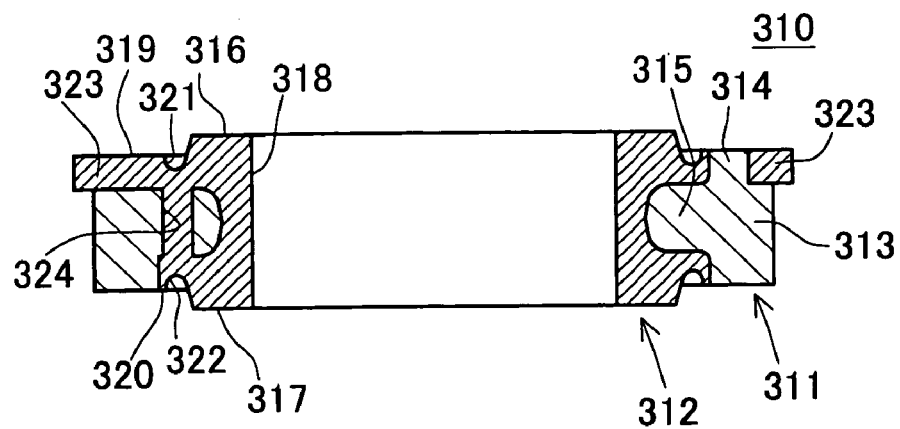
FIG. 6 is a sectional view of the gasket taken along a line A-A in FIG. 5.

FIG. 5 is a plan view of the gasket 310. FIG. 6 is a sectional view, taken along a line A-A in FIG. 5.

The gasket 310 includes a resinous core part 311 and a rubber part 312 molded on the inner circumference of the core part 311 by insert molding. Providing the rubber part 312 on the inner circumference of the core part 311 is to arrange the rubber part 312 having an elastic force to provide a liquid-contact plane, ensuring the sealing performance. The gasket 310 is of an annular shape designed to have an outer diameter substantially equal to the diameter of the first and second gasket recesses 305 and 307 to align the first and second flow passages 304 and 306 (see FIG. 4), and an inside diameter larger than the first and second flow passages 304 and 306 in consideration of the deformed amount of the rubber part 312 in order to prevent the rubber part 312 when interposed between the first and second gasket recesses 305 and 307 from protruding into the first and second flow passages 304 and 306.

As shown in FIG. 6, the core part 311 is made of resin such as PFA and PPS in a special shape by injection molding, including an outer-circumferential positioning portion 313, a stopping projection 314, and a central support portion 315. The outer-circumferential positioning portion 313 is of a cylindrical shape having an outer periphery in contact with circumferential surfaces 305*a* and 307*a* of the first and second gasket recesses 305 and 307 (see FIG. 4). The outer-circumferential positioning portion 313 is designed to have a thickness enough to ensure pressure resistance. In the present embodiment, for instance, the thickness of the outer-circumferential positioning portion 313 is determined to about a half of the width of the first and second gasket recesses 305 and 307 (see FIG. 4). The outer-circumferential positioning portion 313 is designed to have a length in an axial direction substantially equal to the height of the seal holding part 308 in the axial direction in order to prevent rattling in the axial direction. Further, the outer-circumferential positioning portion 313 is provided with a plurality of arcuate stopping projections 314 formed by cutting out the upper end face in the figure. Intermittent arrangement of the stopping projections 314 is to facilitate insert molding of the rubber part 312. In addition, the outer-circumferential positioning portion 313 is provided with the central support portion 315 annularly formed to protrude inward from about a center of an inner periphery. The central support portion 315 is formed with a semicircular end to prevent concentration of stress to the rubber part 312 during pressurization thereto.

The rubber part 312 is made of an elastic material (e.g., perfluoro elastomer (FFKM)) into a special shape by insert molding, integral with the core part 311. The rubber part 312 is provided with an upper surface 316 to be brought in contact with the first gasket recess 305, a lower surface 317 parallel to the upper surface 316 and to be brought in contact with the second gasket recess 307, and an inner surface 318 perpendicular to the upper and lower surfaces 316 and 317. The rubber part 312 includes an almost central part supported by the central support portion 315 of the core part 311, and an upper and lower symmetrical portions with respect to the central support portion 315. In other words, the rubber part 312 includes stepped portions 319 and 320 formed by largely cutting out the upper surface 316 and the lower surface 317 so that the upper surface 316 and the lower surface 317 have substantially the same area which seal with respect to the first and second gasket recesses 305 and 307. The stepped portions 319 and 320 are provided to be flush with the end face of the core part 311 to prevent the rubber part 312 from radially outwardly expanding. Accordingly, the rubber part 312 when fitted between the first gasket recess 305 and the second gasket recess 307 (see FIG. 4) will expand to the inner surface 318 side. To prevent the rubber part 312 from protruding into the first and second flow passages 304 and 306, however, annular grooves 321 and 322 are provided to absorb the deformation of the rubber part 312.

Since such gasket 310 has an almost uniform sealing force at both the upper surface 316 and the lower surface 317, it is uncertain whether the gasket 310 is adsorbed to the first flow-passage block 302 or the second flow-passage block 303 when separated. This may cause the gasket 310 to be left unattached. Hence, the gasket 310 is provided with a plurality of engagement portions 323 extending outwardly from the outer edge of the stepped portion 319 so that the gasket 310 is adsorbed to the first flow-passage block 302 provided with the first gasket recess 305. Each engagement portion 323 is integrally formed with the rubber part 312 during the insert molding so that it is continuous with the inner surface 318 of the rubber part 312 through between the stopping projections 314. Further, a slit 325 is formed between the engagement portions 323.

Meanwhile, the gasket 310 is arranged that the core part 311 and the rubber part 312 are separate components. Repeated deformation of the rubber part 312 may cause separation of the core part 311 and the rubber part 312, leading to displacement of the sealing surfaces. The gasket 310 is therefore provided with a plurality of through holes 324 in the central support portion 315 of the core part 311 so that the rubber part 312 penetrates into each through hole 324 of the core part 311 to physically integrally combine the core part 311 and the rubber part 312. In the gasket 310, the through holes 324 are arranged in positions corresponding to each midpoint between the stopping projections 314 in order to absorb the force transmitting through between the stopping projections 314.

Figure 7:
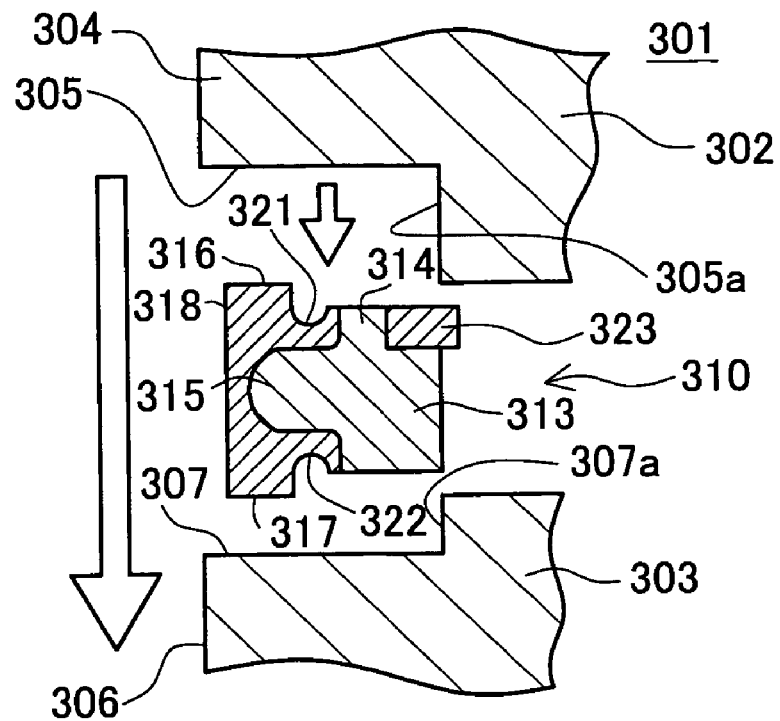
FIG. 7 is a view showing a fitting manner of the gasket.
Figure 8:
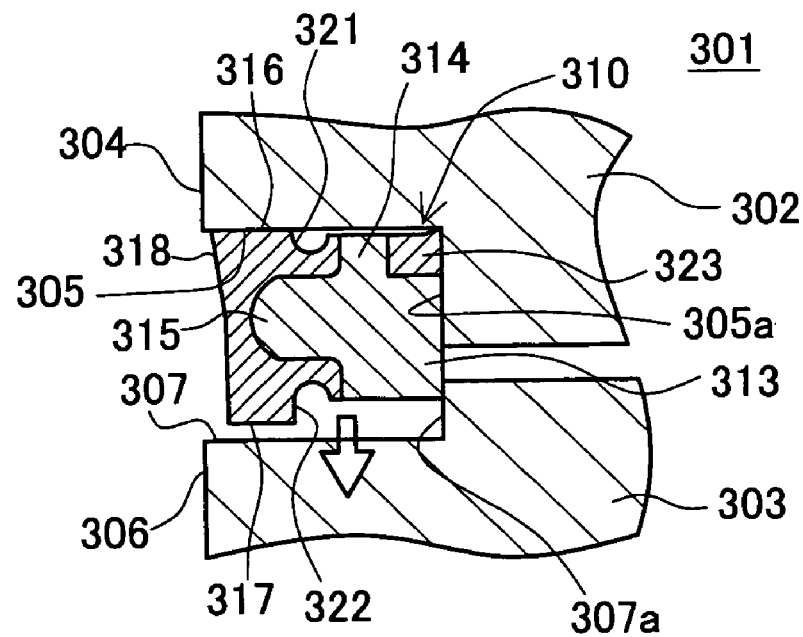
FIG. 8 is a view showing the fitting manner of the gasket.
Figure 9:
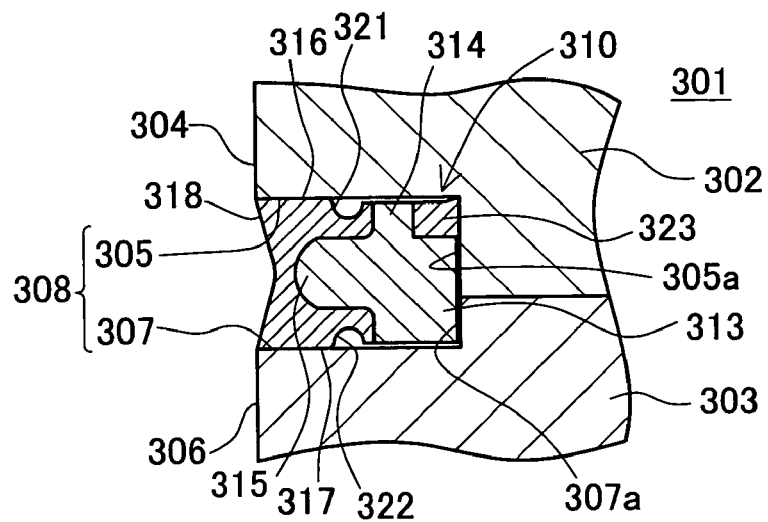
FIG. 9 is a view showing the fitting manner of the gasket.

This gasket 310 is fitted in the first and second flow-passage blocks 302 and 303 in the following manner. FIGS. 7 to 9 are views showing the fitting manner of the gasket 310.

As shown in FIG. 7, the gasket 310 is engaged in the first gasket recess 305 of the first flow-passage block 302 and then the first flow-passage block 302 is mounted on the second flow-passage block 303. Specifically, while the engagement portions 323 are distorted against the first gasket recess 305, the outer-circumferential positioning portion 313 is fitted in the first gasket recess 305, setting the gasket 310 in the first gasket recess 305. The gasket 310 is positioned in place when the outer periphery of the outer-circumferential positioning portion 313 is brought in contact with the circumferential surface 305a of the first gasket recess 305, and then the upper surface 316 of the rubber part 312 is brought in contact with a predetermined portion of the first gasket recess 305. Thereafter, the gasket 310 is pushed into the first gasket recess 305 so that the stopping projections 314 abut on the bottom of the first gasket recess 305, deforming the rubber part 312. In this case, the stopping projections 314 make it hard to transmit the force through the rubber part 312 between the outside and the inside of each engagement portion 314. The force applied from the first gasket recess 305 to the upper surface 316 is blocked by each engagement portion 314 and acts on the inner surface 318 side, so that the rubber part 312 is deformed to expand on the inner surface 318 side as shown in FIG. 8. However, at this moment, the inner surface 318 is not yet contiguous with the flow passage surface of the first flow passage 304. There are still irregularities between the first gasket recess 305 and the gasket 310.

Herein, each engagement portion 323 is compressed between each stopping projection 314 and the circumferential surface 305a of the first gasket recess 305, producing a repulsion force, thereby allowing the gasket 310 to be adsorbed to the first flow-passage block 302 without dropping off. At this time, the inward force on each engagement portion 323 exerted by the circumferential surface 305a of the first gasket recess 305 is blocked by each stopping projection 314 and is not so much transmitted to the inner surface 318 side.

Accordingly, this is unlikely to cause the rubber part 312 to protrude into the first and second flow passages 304 and 306.

As shown in FIG. 8, successively, the gasket 310 is fitted in the second gasket recess 307 so that the outer-circumferential positioning portion 313 is engaged in the second gasket recess 307. Specifically, the gasket 310 is positioned in place when the outer periphery of the outer-circumferential positioning portion 313 is brought in contact with the circumferential surface 307a of the second gasket recess 307, and then the lower surface 317 of the rubber part 312 is brought in contact with a predetermined portion of the second gasket recess 307. Thereafter, the gasket 310 is pushed into the second gasket recess 307 and the circumferential positioning portions 313 abut on the bottom of the second gasket recess 307, deforming the rubber part 312. In this state, the rubber part 312 is unable to transmit the force outwardly because of the outer-circumferential positioning portion 313. Accordingly, the force applied from the second gasket recess 307 to the lower surface 317 is blocked by the outer-circumferential positioning portion 313 and acts on the inner surface 318 side, so that the rubber part 312 is deformed to expand on the inner side 318 side as shown in FIG. 9. However, at this time, the upper surface 316 being also pressed against the first gasket recess 305 is similarly deformed to expand on the inner surface 318 side. The gasket 310 is deformed with the inner surface 318 being partly pushed to the first and second flow passages 304 and 306. Thus, the central part of the inner surface 318 is recessed outwardly and becomes contiguous with the flow passage surface of the first and second flow passages 304 and 306.

In this state of the gasket 310, the outer periphery of the outer-circumferential positioning portion 313 is in contact with the circumferential surfaces 305a and 307a of the first and second gasket recesses 305 and 307, placing the first flow passage 304 and the second flow passage 306 in aligned relation. In other word, the gasket 310 functions as an axis for preventing axial misalignment of the first flow-passage block 302 and the second flow-passage block 303. The gasket 310 comprises the core part 311 and the rubber part 312 which are separate components; however, the rubber part 312 is made by insert molding to be integral with the core part 311 precisely made of resin by injection molding. The gasket 310 is therefore manufactured with dimensional accuracy equivalent to a single component. In the flow-passage seal structure 301, accordingly, it is easy to ensure accuracy of the first and second flow passages 304 and 306, the sealing surfaces of the gasket 310, the outer periphery of the outer-circumferential positioning portion 313, and the circumferential surfaces 305a and 307a of the first and second gasket recesses 305 and 307.

In the flow-passage seal structure 301 and the gasket 310 of the present embodiment having the inner surface 318 contiguous with the first and second flow passages 304 and 306, when a fluid is allowed to flow from the second flow passage 306 of the second flow-passage block 303 to the first flow passage 304 of the first flow-passage block 302, a stagnation area or a turbulence area is unlikely to be generated in the sealing part.

Since the rubber part 312 is provided on the inner circumference of the resinous core part 311, even if a high fluid pressure of for example 0.3 MPa is exerted on the rubber part 312, which might be deformed outwardly, the core part 311 is firmly retained between the rubber part 312 and the circumferential surfaces 305a and 307a of the first and second gasket recesses 305 and 307. The deformation of the rubber part 312 can therefore be prevented. Accordingly, the sealing surfaces of the upper surface 316 and the lower surface 317 sealing with respect to the first and second gasket recesses 305 and 307 are unlikely to be displaced. This makes it possible to stably hold the gasket 310 with the rubber part 312 being contiguous with the flow passage surface of the first and second flow passages 304 and 306. In addition, since the rubber part 312 is integrally made with the core part 311 by insert molding, the gasket 310 can be manufactured with dimensional accuracy equivalent to a single component and at low cost, with the result that the dimensional accuracy has little effect on the sealing surfaces.

Consequently, according to the flow-passage seal structure 301 and the gasket 310 of the present embodiment, the core part 311 restricts the outward deformation of the rubber part 312 even under the fluid pressure, thereby stably retaining the gasket 310 between the first and second gasket recesses 305 and 307. This makes it possible to enhance the sealing reliability during pressurization.

In particular, the gasket 310 with the inner surface 318 in a curved state is fitted in the first and second gasket recesses 305 and 307, so that the central part is apt to be subjected to the action of the fluid pressure. However, the central support portion 315 of the core part 311 supports the rubber part 312 at the substantial center thereof, which prevents the inner surface 318 from expanding radially outwardly to be deformed. Accordingly, the sealing surfaces are more unlikely to be displaced.

The core part 311 of the gasket 310 includes the outer-circumferential positioning portion 313 whose outer periphery is engaged with the first gasket recess 305 and the second gasket recess 307, thereby aligning the first flow passage 304 and the second flow passage 306. Accordingly, the core part 311 which is a resinous molded product and the first and second flow-passage blocks 302 and 303 are positioned in contact with each other. This can ensure accuracy of the first flow passage 304, the second flow passage 306, the sealing surfaces of the gasket 310, the circumferential surface 305a of the first gasket recess 305, the circumferential surface 307a of the second gasket recess 307, and the outer periphery of the outer-circumferential positioning portion 313, resulting in an improvement of the mutual sealing reliability of the components. In addition, the first and second flow-passage blocks 302 and 303 are aligned by the outer-circumferential positioning portion 313 of the gasket 310, preventing axial misalignment of the gasket 310 which causes part of the sealing surfaces to protrude into the first and second flow passages 304 and 306. This makes it possible to prevent the generation of a stagnation area and a turbulence area and hence to avoid a decrease in sealing area resulting in a deterioration in sealing performance.

In the gasket 310, further, the rubber part 312 is formed with the engagement portions 323 elastically deformable to be engaged in the first gasket recess 305. For instance, when the first flow-passage block 302 and the second flow-passage block 303 are separated, the gasket 310 will not drop off from the first gasket recess 305. The workability can be enhanced accordingly.

The engagement portions 323 are formed with the slits 325, so that gaps formed between the gasket 310 and the first and second seal holding recesses 305 and 307 respectively are communicated with each other through the slits 325. This allows release of air accumulated in the gaps to the outside through the mating surfaces of the first and second flow-passage blocks 302 and 303. It is therefore possible to prevent the air in an air pocket from flowing in the flow passage to generate air bubbles.

The integrated valve 1001 and the fluid device 1102 provided with the seal structure 301 of the present embodiment can restrain the generation of a stagnation area and an accumulation area. Even in the case of control of the high-pressure fluid, it is possible to prevent displacement of the sealing surfaces, thereby preventing fluid leakage.

Fourth Embodiment

Figure 10:
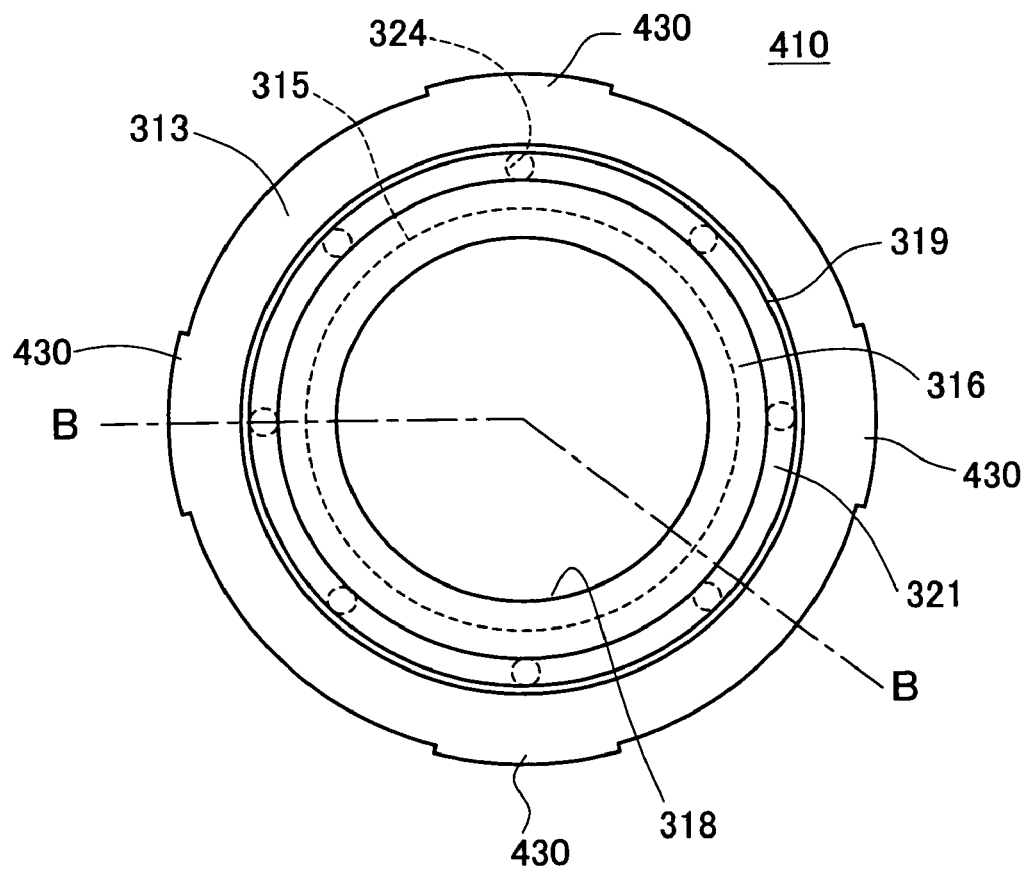
FIG. 10 is a plan view of a gasket constituting a seal structure in a fourth embodiment.
Figure 11:
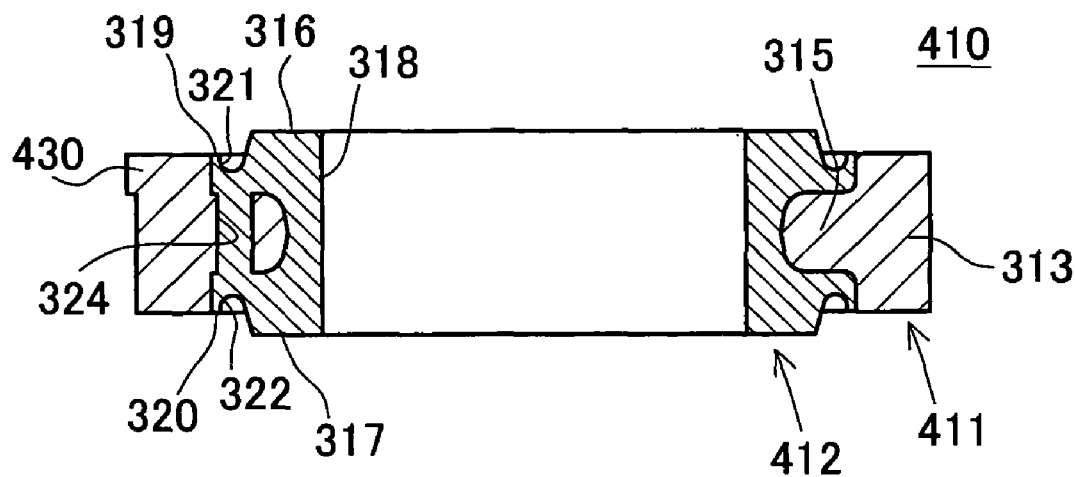
FIG. 11 is a sectional view of the gasket taken along a line B-B in FIG. 10.

A fourth embodiment of the present invention will be described below with reference to the drawings. FIG. 10 is a plan view of a gasket 410. FIG. 11 is a sectional view, taken along a line B-B in FIG. 10.

The seal structure of the present embodiment is different in the use of the gasket 410 provided with engagement portions 430 as part of a core part 411 from the seal structure 301 of the third embodiment including the engagement portions 323 as part of the rubber part 312, and is identical to those of the third embodiment. Thus, the following explanation is made on the different parts from the third embodiment. The identical parts are given the same reference numerals in the drawings as those of the third embodiment and are not repeatedly explained below.

The gasket 410 seals the sealing part of the first flow-passage block 302 and the second flow-passage block 303 as in the flow-passage seal structure 301 of the third embodiment. The gasket 410 includes the core part 411 made of resin and a rubber part 412 made on the inner circumference of the core part 411 by insert molding.

As shown in FIG. 11, the core part 411 is made of resin such as PPA by injection molding, including an outer-circumferential positioning portion 313 and a central support portion 315. Differently from the core part 311 of the third embodiment, no stopping projection 314 is provided. The outer-circumferential positioning portion 313 is formed with engagement portions 430 outwardly protruding from the upper periphery.

The rubber part 412 includes an upper surface 316, a lower surface 317, an inner surface 318, stepped portions 319 and 320, and annular grooves 321 and 322. The rubber part 412 is provided with no stopping projection 314 in the core part 411. Accordingly, the outer-circumferential positioning portion 313 of the core part 411 disables outward deformation of the outer periphery of the rubber part 412.

Such gasket 410 is pressure fitted in the first gasket recess 305 from the upper surface 316 side. Accordingly, the engagement portions 430 is pressed between the outer-circumferential positioning portion 313 and the first gasket recess 305 and adsorbed to the first gasket recess 305. In this case, the core part 411 is of larger hardness than the rubber part 412. Even when the engagement portions 430 are pressed, the core part 411 will not so move to an inside surface side as to make the inner surface 318 of the rubber part 412 expand inwardly. With the outer periphery of the outer-circumferential positioning portion 313 serving as a guide, the gasket 410 is fitted into the second gasket recess 307. At this time, the rubber part 412 is pressed between the first gasket recess 305 and the second gasket recess 307, causing the inner surface 318 to be curved outwardly and contiguous with the first and second flow passages 304 and 306. The operations and effects obtained by pressurizing the inner surface 318 are similar to those of the third embodiment and the explanation thereof is omitted.

As above, according to the flow-passage seal structure 301 of the present embodiment and the gasket 410, the core part 411 is provided, on the outer periphery, with the engagement portions 430 which are pressure fitted in engagement with the first gasket recess 305. Therefore, when the first flow-passage block 302 and the second flow-passage block 303 are separated for instance, the gasket 410 can be prevented from dropping off, resulting in improved workability. Further, the rubber part 412 is provided with no engagement portion 430, so that a specific sealing material (e.g. FFKM) for the rubber part 412 can be reduced in amount as compared with the gasket 310 of the third embodiment, achieving cost down.

Fifth Embodiment

A fifth embodiment of the present invention will be described below with reference to the drawings.

A seal structure 501 of the present embodiment corresponds to an improved one of the seal structure 301 of the third embodiment. The gasket 301 used in the seal structure 301 of the third embodiment is arranged such that even where the inner surface 318 is subjected to the action of high pressure, the core part 311 receives the pressure to restrain the deformation of the rubber part 312. Thus the gasket 310 has an advantage that the sealing surfaces are not displaced, developing superior sealing performance. However, the costs of materials and processing of the gasket 310 are expensive, leading to a high production cost. Hence, the seal structure 501 of the present embodiment is characterized in that a gasket (corresponding to the "sealing member" of the claims) 510 is made of a single material in a shape improved for ensuring resistance to pressure.

Figure 12:
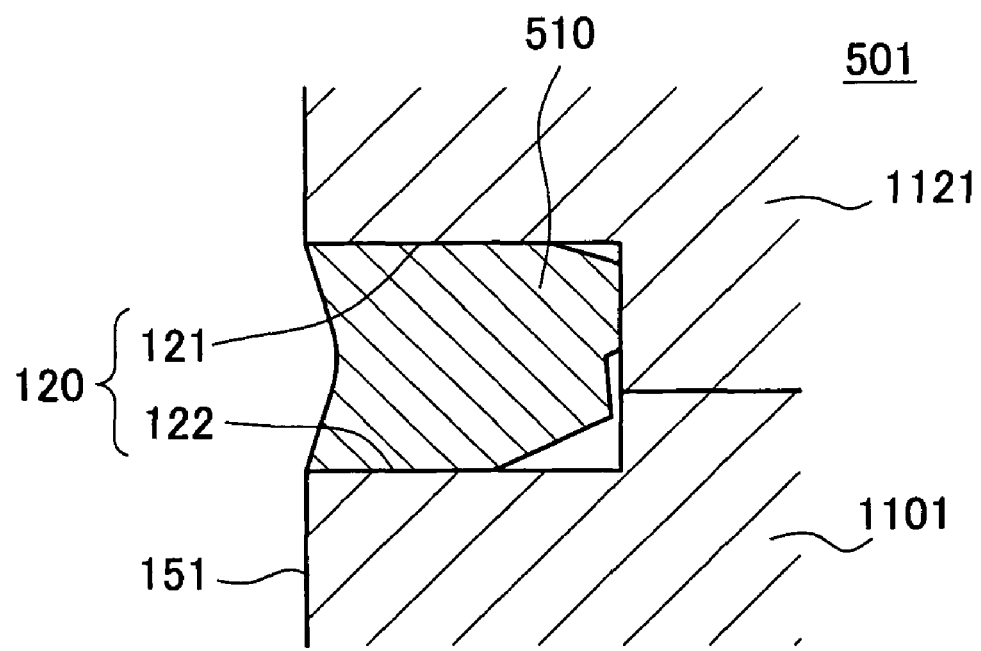
FIG. 12 is a sectional view of a seal structure in a fifth embodiment, showing a configuration that a sealing member is fitted in a sealing part.

FIG. 12 is a sectional view of the seal structure 501 of which a sealing member 510 is fitted in a sealing part.

The seal structure 501 is provided in the integrated valve 1001 shown in FIG. 25 as in the conventional one. Further, the seal structure is provided in the sealing part when the fluid device 1102 is mounted on the flow-passage block 1101 constituting the integrated valve 1001 as shown in FIG. 26. A seal holding part 120 in which the gasket 510 is fitted is formed by the seal holding grooves combined with each other to have a rectangular section as shown in FIG. 12, which includes the upper retaining surface (corresponding to the "first retaining surface" of the claims) 121, the lower retaining surface (corresponding to the "second retaining surface" of the claims) 122, and the circumferential retaining surface 123 formed as an innermost face perpendicular to those parallel surfaces 121 and 122. The gasket 510 is elastically deformed when fitted in the seal holding part 120, thus sealing the flow passage joining portion.

Figure 13:
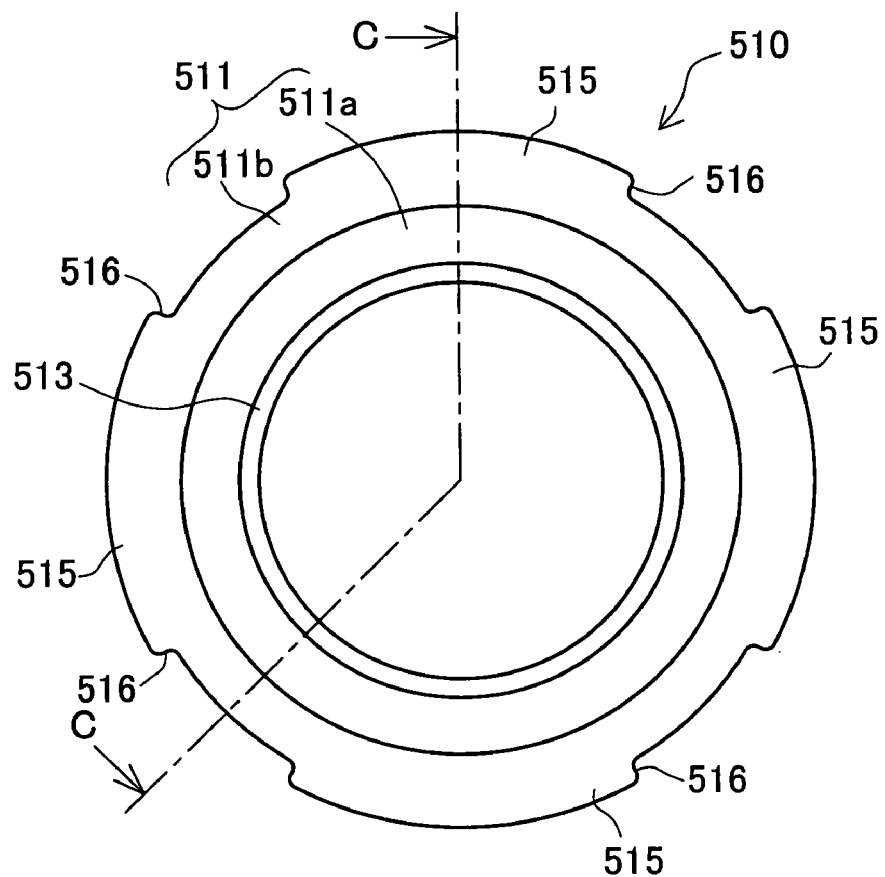
FIG. 13 is a plan view of the gasket constituting the seal structure of the fifth embodiment.
Figure 14:
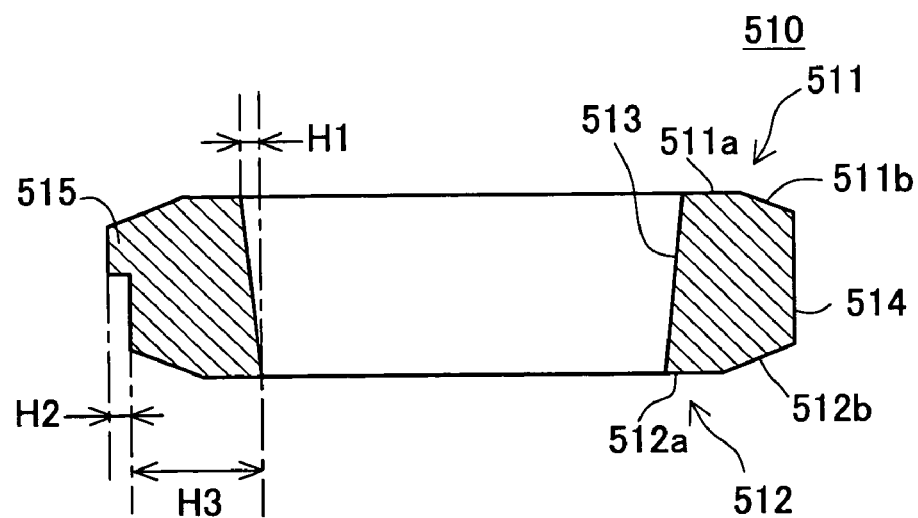
FIG. 14 is a sectional view, taken along a line C-C in FIG. 13.

FIG. 13 is a plan view of the gasket 510. FIG. 14 is a sectional view, taken along a line C-C in FIG. 13.

The gasket 510 is made of an elastic material (rubber such as perfluoro rubber (FFKM)), unburned PTFE (unburned fluorocarbon resin)) in a special shape shown in FIGS. 13 and 14 by injection molding. The gasket 510 is annular as shown in FIG. 13. The gasket 510 is of a substantially rectangular section as shown in FIG. 14, including an upper surface 511 (corresponding to a "first surface" of the claims) which is brought in contact with the upper retaining surface 121, forming the sealing surface, a lower surface 512 (corresponding to a "second surface" of the claims) which is brought in contact with the lower retaining surface 122, forming the sealing surface, an inner surface 513 joining inner edge of the upper and lower surfaces 511 and 512, and an outer surface 514 joining outer edges of the upper and lower surfaces 511 and 512.

As shown in FIG. 13, the gasket 510 is provided with engagement portions 515 radially outwardly extending to prevent the gasket 510 from dropping off from the seal holding part 120, and four slits 516 formed in the engagement portions 515 at circumferentially regular intervals. Accordingly, when inserted in the seal holding part 120, the gasket 510 is tightly held at four sites of the engagement portions 515.

As shown in FIG. 14, the engagement portions 515 are provided on the outer surface 514 on the upper surface 511 side. This is to allow the gasket 510 to be adsorbed to the body 1121 at any time, for example during replacement or the like by demounting the body 1121 of the fluid device 1102 from the flow-passage block 1101, thereby preventing the gasket 510 from being left unattached. When the gasket 510 provided with the engagement portions 515 is fitted in the seal holding part 120 while pressing the engagement portions 515 against the seal holding part 120, the gasket 510 is turned to inwardly move the open end of the inner surface 513 on the upper surface 511 side. It is therefore necessary to arrange the gasket 510 so as not to allow the inner surface 513 to protrude from the flow passage surface when the gasket 510 is fitted in the seal holding part 120.

Figure 15:
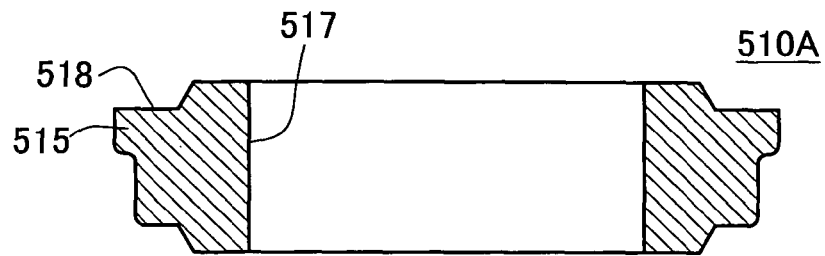
FIG. 15 is a sectional view showing a first comparative example of the gasket.

FIG. 15 is a sectional view showing a first comparative example 510A of the gasket. FIG. 15 is a sectional view showing a second comparative example 510B of the gasket.

For instance, as shown in the first comparative example 510A shown in FIG. 15, an inner surface 517 is formed in a cylindrical shape having a uniform diameter. In this case, when engagement portions 515 are inserted in the seal holding part 120, the open end of the inner surface 517 on the upper surface side in the figure is deformed to protrude inward. Accordingly, the comparative example 510A is provided with a stepped portion 518 around the sealing surface to release part of deformation to the outside. However, when the first comparative example 510A merely provided with the stepped portion 518 was fitted in the seal holding part 120, the end of the inner surface 517 on the upper surface side in the figure protruded into the flow passage, causing a stagnation area and a turbulence area in the sealing part.

Figure 16:
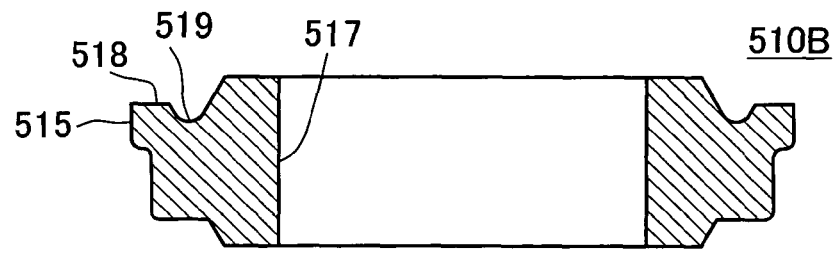
FIG. 16 is a sectional view showing a second comparative example of the gasket.

Hence, it is conceivable to form an annular groove 519 in the stepped portion 518 as shown in the second comparative example 510B shown in FIG. 16 to improve absorbability to deformation. However, it was found that when the second comparative example 510B was fitted in the seal holding part 120 and then a high-pressure fluid was supplied thereto, the fluid leaked out. This is conceivably because forming the annular groove 519 leads to deterioration in pressure resistance to outward pressure, so that the sealing surfaces are likely to be displaced.

Consequently, it is necessary to design the shape of the gasket 510 suitable for ensuring pressure resistance to outward pressure and preventing the inner surface 513 from protruding into the flow passage when the gasket 510 is fitted in the seal holding part 120.

To meet this demand, the inner surface 513 of the gasket 510 is tapered with a diameter becoming smaller from the upper surface 511 side to the lower surface 512 side. The taper is preferably designed to have an inclination width H1 almost equal to a protruding width H2 of each engagement portion 515. This is because the inclination corresponding to the inward protrusion of the inner surface 513 caused by pressure on the engagement portions 515 allows easy control of a deformed amount of the gasket 510 needed to align the ends of the upper and lower surfaces 511 and 512 on the inner surface side to the ends of the upper and lower retaining surfaces 121 and 122 on the open sides when the gasket 510 is fitted in the seal holding part 120 to seal it. To be concrete, the inclination width H1 for the gasket 510 if made of rubber is desired to be 85% to 95% with respect to the protruding width H2 of the engagement portion 515. It is essentially preferable that the inclination width H1 of the taper equals to the protruding width H2 of the engagement portion 515. However, considering that the Poisson's ratio of rubber is about 0.5, it is preferable that "Inclination width H1"=95%× "Protruding width H2" in consideration of a difference in inner and outer diameters and the range is 85% to 95% assuming that the dimensional tolerance is about 10%. Alternatively, the inclination width H1 of the taper for the gasket 510 if made of resin is desired to be 75% to 85% with respect to the protruding width H2 of the engagement portion 515. In this case, the resinous gasket has the Poisson's ratio of about 0.45 and therefore can internally absorb about 10% deformation as compared with the rubber gasket.

Too large protruding width H2 of the engagement portion 515 may generate a large gap between the circumferential surface 123 of the seal holding part 120 and the outer surface 514 of the gasket 510 when the gasket 510 is set in the seal holding part 120. In this case, if a high fluid pressure acts on the inner surface 513 of the gasket 510, the gasket 510 is supported against the pressure by the engagement portions 515 alone. This may cause the sealing surfaces of the gasket 510 to be displaced in the outer diameter direction. Displacement of the sealing surfaces in the outer diameter direction is likely to form irregularities between the flow passage 150 and the seal holding part 120, leading to a stagnation area and a turbulence area. To avoid such defect, the protruding width H2 of the engagement portion 515 is determined to the extent allowing the outer surface 514 to come into contact with the circumferential surface 123 of the seal holding part 120 when the gasket 510 is fitted in a sealing state in the seal holding part 120. To be concrete, the protruding width H2 of the engagement portion 515 of the rubber gasket 510 is desirably determined to 10% to 20% with respect of the thickness H3. Basically the protruding width H2 determined to about 10% of the thickness H3 allows a suitable contact when the gasket 510 is fitted in the seal holding part 120; however, the above range of 10% to 20% is preferable assuming that the dimensional tolerance is about 10%. Alternatively, the protruding width H2 of the engagement portion 515 of the resinous gasket 510 is desirably determined to 10% to 30% with respect to the thickness H3. This is because the resinous gasket, which has larger rigidity than rubber, can ensure pressure resistance irrespective of a slight gap with respect to the seal holding part 120, so that the dimensional tolerance can be determined to about 20%.

In the present embodiment, the gasket 510 is made of FFKM, which is 6.85 mm in outer diameter of the outer surface 514, 2.7 mm in thickness H3, 0.4 mm in inclination with H1 of the taper, and 0.45 mm in protruding width H2 of the engagement portion 515.

To bring the outer surface 514 of the gasket 510 in contact with the circumferential surface 123 of the seal holding part 120 when the gasket 510 is to be fitted in the seal holding part 120, not only the gasket 510 but also the seal holding part 120 shown in FIG. 12 has to be strictly controlled in dimension. The seal holding grooves forming the seal holding part 120 are formed by drilling a closed-end cylindrical hole in a surface of each of the flow-passage block 1101 and the body 1121 made of resin by injection molding. However, in the case where the flow-passage member in which the gasket 510 is to be fitted is of a uniform thickness, the seal holding groove does not have to be made by drilling because it can be formed with accuracy during injection molding of the flow-passage member.

As shown in FIG. 12, the gasket 510 is held between the upper retaining surface 121 and the lower retaining surface 122 of the seal holding part 120 to seal it. Even if the inner surface 513 of the gasket 510 is tapered, therefore, the inner surface 513 of the gasket 510 is likely to protrude into the flow passage 150 when the gasket 510 is placed between the upper retaining surface 121 and the lower retaining surface 122.

Accordingly, the gasket 510 is formed with slant surfaces 511b and 512b in the upper surface 511 and the lower surface 512 as shown in FIG. 14. Each of the upper surface 511 and the lower surface 512 is made flat up to a predetermined position (1.2 mm in the present embodiment) outside from the inner open end by a predetermined distance, providing an annular sealing surface 511a, 512a. Herein, the "predetermined position" represents a dimension (position) determined by calculation to realize a setting gasket volume. This setting gasket volume is calculated by multiplying a groove volume by 0.9 ("Set gasket volume"=90%×"Groove volume"). In this case, the seal holding part 120 contains a remaining space of about 10%, but it will not cause problems because the remaining space exists in an area not causing displacement of the sealing surfaces in the outer diameter direction even when the fluid pressure is applied thereto. It should be noted that the gasket 510 will protrude when the setting gasket volume exceeds 100%. The upper surface 511 and the lower surface 512 are formed with the slant surfaces 511b and 512b smoothly slanting from the predetermine position toward the outer surface 514. The sealing surfaces 511a and 512a are the same in area to exert uniform sealing force. When the sealing surfaces 511a and 512a are pressurized, the gasket 510 is elastically deformed by pressure. However, the elastic deformation is partially released to the inclination surfaces 511b and 512b side. This makes it possible to prevent the inner surface 513 of the gasket 510 from excessively protruding into the flow passage 150.

Figure 17:
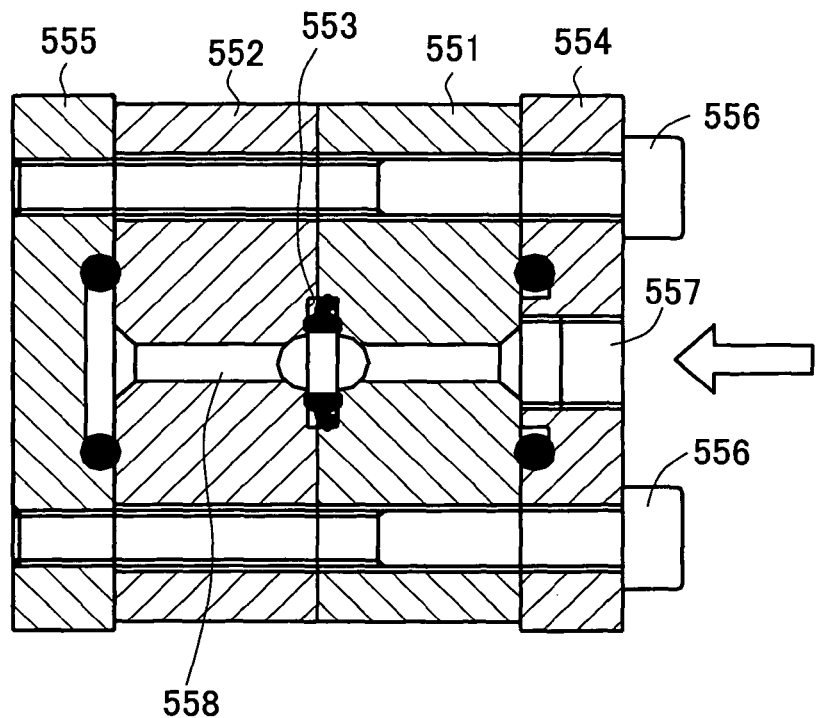
FIG. 17 is a view showing a test method for an endurance test.

Next, test results of endurance of the gasket 510 of the present embodiment and the conventional O-ring 1103 will be explained below. FIG. 17 is a graph showing a test method of an endurance test.

In this endurance test, the gasket 510 or O-ring 1103 as a test piece was set in a seal holding part 553 formed between a first flow-passage block 551 and a second flow-passage block 552. End blocks 554 and 555 were attached to both sides of the first and second flow-passage blocks 551 and 552 and fixed with jigs 556. A test device was thus constituted. The test was conducted in such a manner that a high-permeable test fluid was supplied through an inlet port 557 to repeatedly pressurize the inside of a flow passage 558, and outside leakage was checked every time a predetermined number of pressurization was performed. This was considered as one cycle and the test was executed in a specified number of cycles. Then, the jigs 556 were detached and outside leakage through the sealing surfaces was checked.

As a result, regarding the gasket 510, the test fluid did not adhere to the outer portions of both the first and second flow-passage blocks 551 and 552 relative to the sealing surfaces and no fluid leakage was found. The test fluid also hardly adhered to the inner portions of the gasket 510 relative to the sealing surfaces.

Regarding the O-ring 1103, on the other hand, the test fluid adhered to the outer portions of both the first and second flow-passage blocks 551 and 552 relative to the sealing surfaces and fluid leakage was found. The test fluid also adhered to the inner portions of the O-ring 1103 relative to the sealing surfaces.

This test revealed that the gasket 510 could seal the high-permeability fluid and provide higher sealing reliability than the O-ring 1103. It was further revealed that the gasket 510 could seal at a point closer to an inside diameter as compared with the O-ring 1103, resulting in that the stagnation area and accumulation area were unlikely to be generated.

Figure 18:
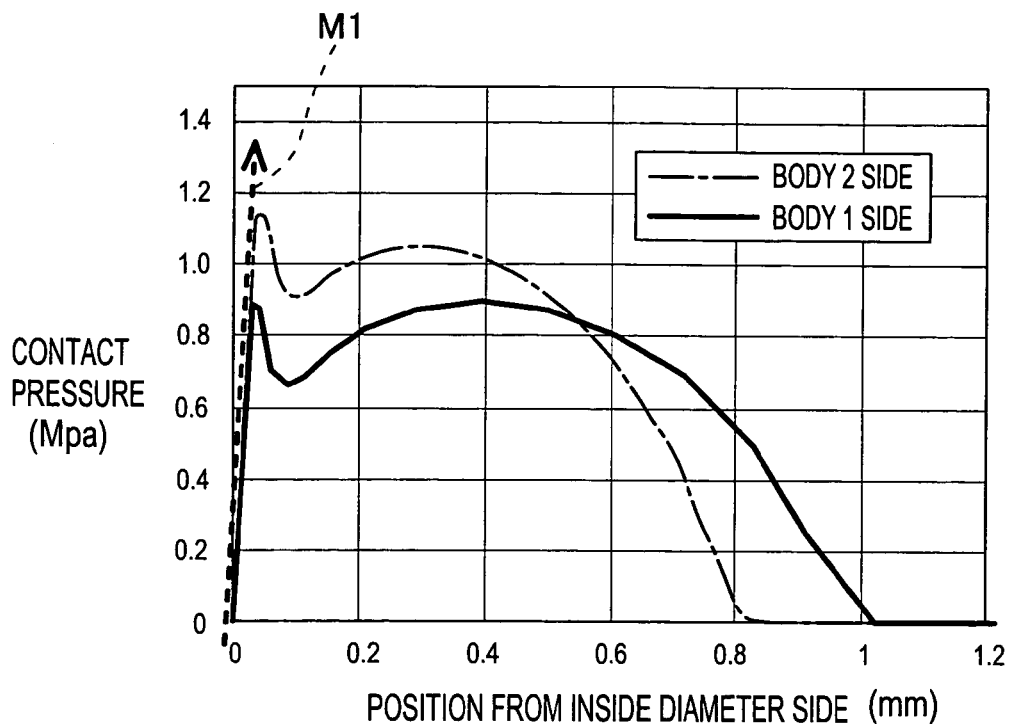
FIG. 18 is a graph showing measurement results of a maximum contact pressure gradient in the seal structure of the fifth embodiment, in which the vertical axis represents contact pressure (MPa) and the horizontal axis represents a position (mm) from an inside diameter side.
Figure 19:
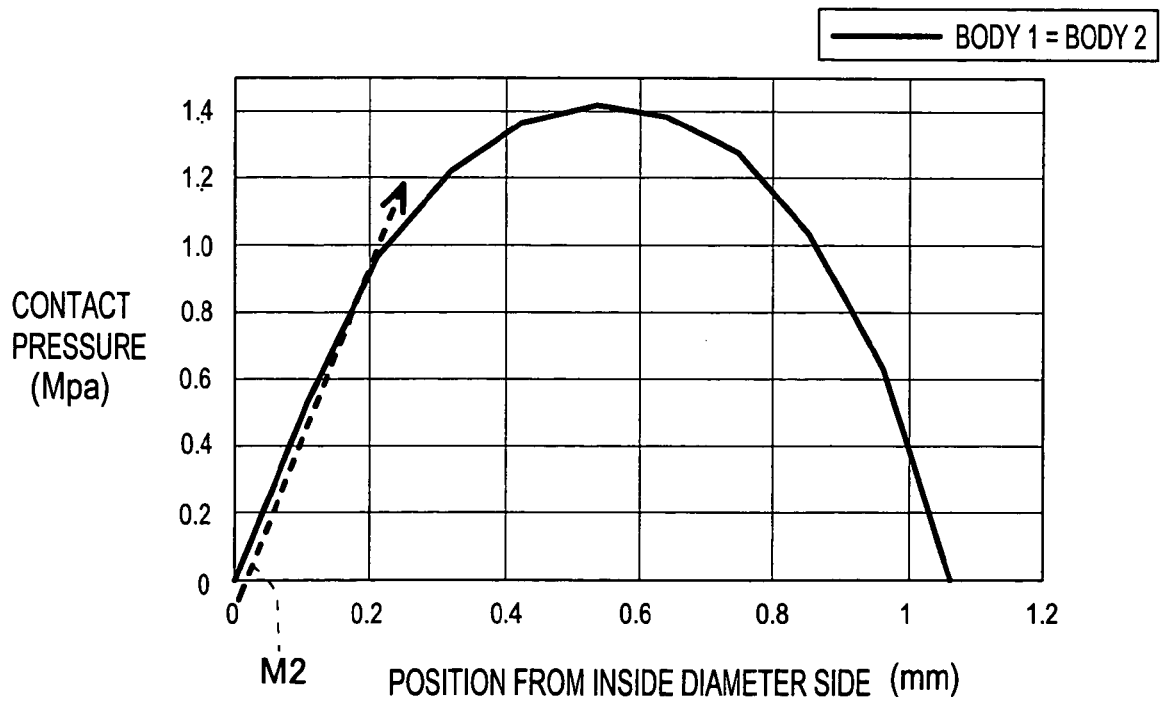
FIG. 19 is a graph showing measurement results of a maximum contact pressure gradient in the seal structure using an O-ring, in which the vertical axis represents contact pressure (MPa) and the horizontal axis represents a position (mm) from an inside diameter side.

Applicants hence studied a maximum contact pressure gradient in the case where the gasket 510 and the O-ring 1103 were set in the seal holding parts 120. FIG. 18 is a graph showing measurement results on the maximum contact pressure gradient in the seal structure 501 in the present embodiment, where the vertical axis indicating a contact pressure (MPa) and the horizontal axis indicating a position (mm) from the inside-diameter side. FIG. 19 is a graph showing measurement results on the maximum contact pressure gradient in the seal structure using the O-ring 1103, with the vertical axis indicating a contact pressure (MPa) and the horizontal axis indicating a position (mm) from the inside-diameter side.

As shown in FIG. 18, with respect to the flow-passage block 1101 (Body 2), the gasket 510 produces a maximum contact pressure of 1.15 MPa at a distance of about 0.05 mm from the inner surface 513 of the gasket 510, and further a contact pressure of about 1.05 MPa at a distance of about 0.3 mm from the inner surface 513. With respect to the body 1121 (Body 1), the gasket 510 produces a maximum contact pressure of about 0.90 MPa at a distance of about 0.05 mm from the inner surface 513, and further a contact pressure of about 0.90 MPa at a distance of about 0.4 mm from the inner surface 513.

As shown in FIG. 19, on the other hand, the O-ring 1103 produces a contact pressure varying in a parabola with respect to both the flow-passage block 1101 (Body 2) and the body 1121 (Body 1), and produces a maximum contact pressure of about 1.40 MPa at a distance of about 0.5 mm from the inside-diameter side.

From the above measurement results, it was revealed that the maximum contact pressure gradient M1 (see FIG. 18) of the gasket 510 was larger than the maximum contact pressure gradient M2 (see FIG. 19) of the O-ring 1103, and the gasket 510 could seal on the inside-diameter side as compared with the O-ring 1103. It is therefore conceivable that the gasket 510 is unlikely to generate a sharply-angled gap with respect to the upper retaining surface 121 and the lower retaining surface 122 (see FIG. 27) which would be caused by the O-ring 1103, and thus the stagnation area and the accumulation area of fluid are unlikely to occur.

Further, from the above measurement results, it was also revealed that the gasket 510 doubly sealed at a position very close to the inner surface 513 and a position outside thereof, whereas the O-ring 1103 singly sealed at a position near the top. Accordingly, it is conceivable that the O-ring 1103 produces a larger maximum contact pressure than the gasket 510, but it would allow fluid to leak out when fluid leakage is caused due to some reasons, while the gasket 510 prevents fluid leakage by the sealing surfaces on the outer side even when fluid is leaking out through the sealing surfaces on the inside-diameter side, so that the fluid is unlikely to leak out.

Figure 20:
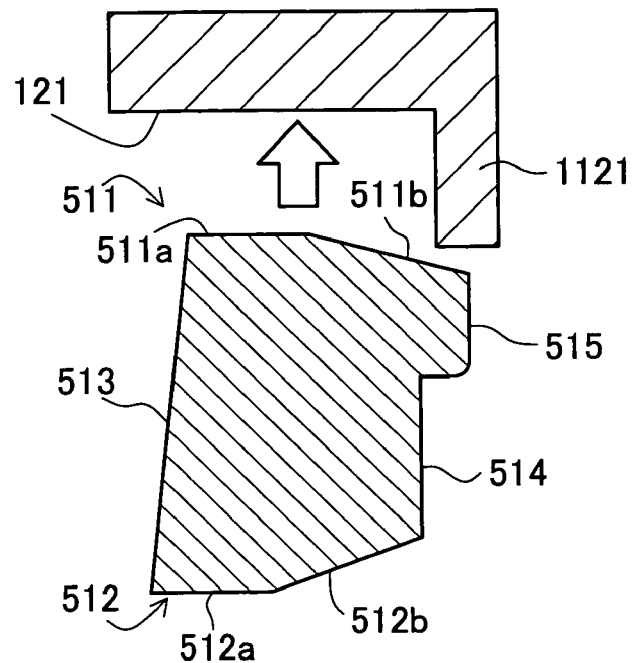
FIG. 20 is a view showing an analysis result on deformation of the gasket of the fifth embodiment.
Figure 21:
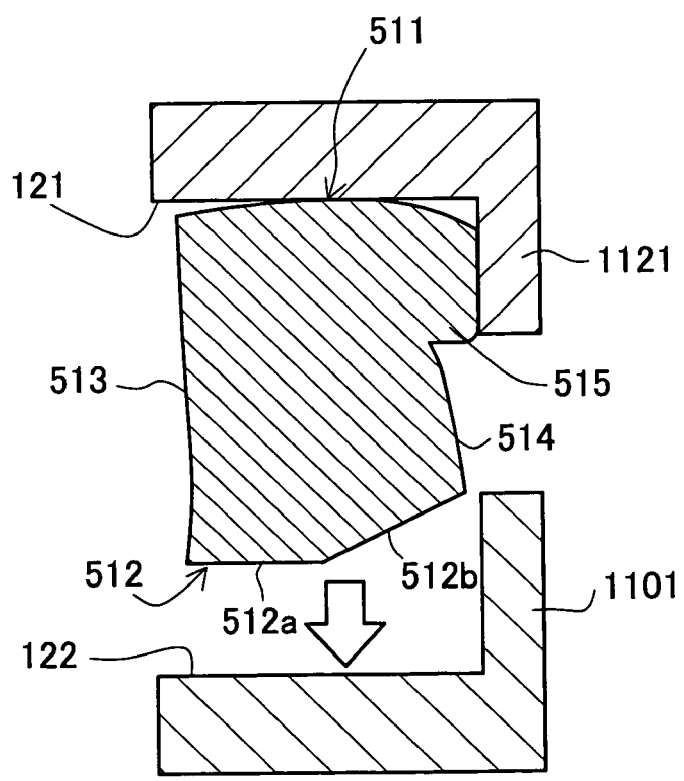
FIG. 21 is a view showing the analysis result on deformation of the gasket of the fifth embodiment.

As above, the gasket 510 has higher sealing performance than the O-ring 1103. This is assumed to be due to deformation characteristics of the gasket 510 during assembly. FIGS. 20 and 21 are views showing analysis results on deformation of the gasket 510.

When the upper surface 511 of the gasket 510 is inserted in the seal holding groove of the body 1121 as shown in FIG. 20, the engagement portions 515 are pressed as shown in FIG. 21. In response to a repulsion force from the engagement portions 515, the gasket 510 is turned to incline the portion on the upper surface 511 side inwardly. Since the inclination width H1 of the taper and the protruding width H2 of the engagement portion 515 are substantially equal, the elastic deformation of the engagement portions 515 bring the position of the open end of the inner surface 513 on the upper surface 511 side in alignment with the position of the open end on the lower surface 512 side. In other words, the taper of the inner surface 513 is eliminated, turning the gasket 510 to a substantially cylindrical shape. In this state, the boundary between the sealing surface 511a and the slant surface 511b is pressed against the upper retaining surface 121 to position the upper surface 511, and the end of upper surface 511 on the inner surface side is held in a noncontact relation with the upper surface 121.

Turning the gasket 510 causes the lower surface 512 to slightly incline so that the end thereof on the inner surface side protrudes downward. When the lower surface 512 of the gasket 510 is inserted in the seal holding groove of the flow-passage block 1101, the end of the lower surface 512 on the inner surface side is first brought in contact with the lower retaining surface 122 and then the sealing surface 512a is gradually brought in contact with the lower surface 122 to pressurize the flow-passage block 1101. By this pressurizing force of the gasket 510, the upper surface 511 is pressed against the upper retaining surface 121 of the body 1121 and the sealing surface 511a is held in close contact with the upper retaining surface 121. In this state, the end of the upper surface 511 on the inner surface side which has been in noncontact with the upper retaining surface 121 is pressed almost vertically against the upper retaining surface 121 under pressure from the lower surface 512 side. Since the end of the lower surface 512 on the inner surface side is first brought in contact with and strongly pressed against the lower retaining surface 122, the end of the upper surface 511 on the inner surface side is also strongly pressed against the upper retaining surface 121. Thus, the maximum contact pressure gradient of the gasket 510 is increased.

Further, in the gasket 510, the boundary between the sealing surface 511a and the slant surface 511b of the upper surface 511 is brought in contact with the upper retaining surface 121 at the time when the lower surface 512 is inserted in the flow-passage block 1101, thereby positioning the sealing position. The boundary is likely to receive load. The force acting on the boundary between the sealing surface 511a and the slant surface 511b of the upper surface 511 also acts on the boundary of the sealing surface 512a and the slant surface 512b of the lower surface 512. Accordingly, the upper and lower surfaces 511 and 512 of the gasket 510 constitute the sealing surfaces providing a larger contact pressure at not only the portion close to the inside diameter side but also the portion away therefrom.

Figure 22:
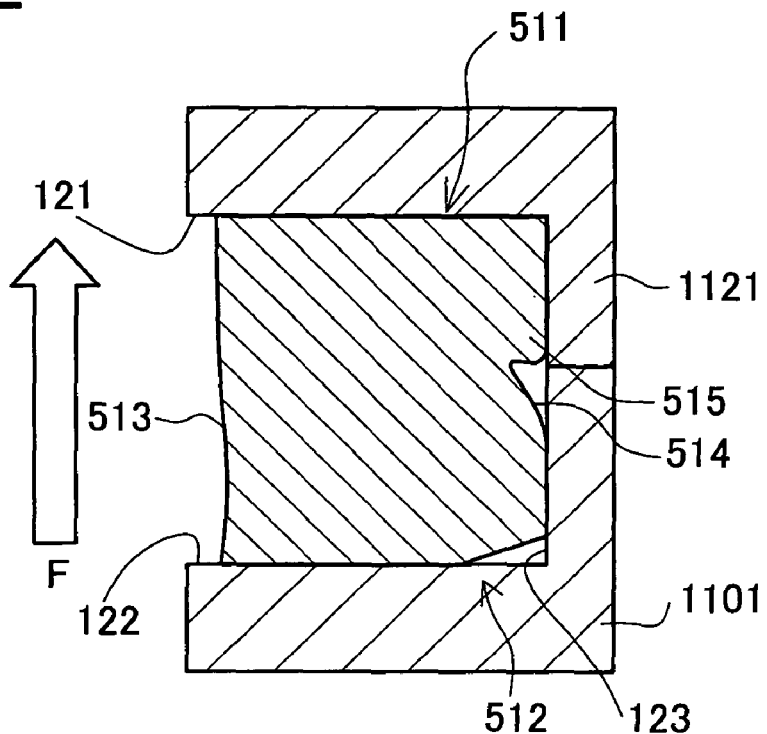
FIG. 22 is a view showing the analysis result on deformation of the gasket of the fifth embodiment.

As shown in FIG. 22, the gasket 510 fitted in the seal holding part 120 is pressed between the upper retaining surface 121 and the lower retaining surface 122 and is deformed in a diameter direction. Having the slant surfaces 511b and 512b in the upper and lower surfaces 511 and 512, the gasket 510 releases deformation to the outer surface 514 side, and the outer surface 514 is brought in contact with the circumferential surface 123 of the seal holding part 120. In this manner, in addition to the engagement portions 515, the outer surface 514 is also brought in contact with the circumferential surface 123 so that the fluid pressure exerted on the inner surface 513 is supported by contact between the outer surface 514 of the gasket 510 and the circumferential surface 123. In addition, the upper and lower surfaces 511 and 512 are of a simple shape that the sealing surfaces 511a and 512a are smoothly continuous to the slant surfaces 511b and 512b respectively, the gasket 510 becomes shaped in block in the seal holding part 120. Even though the gasket 510 has no core part 311 used in the gasket 310 of the third embodiment, accordingly, the gasket 510 can ensure pressure resistance.

In the case of intermittent control of the fluid, for example, the fluid will intermittently act on the inner surface 513 of the gasket 510. Since a gap exists between the seal holding part 120 and the gasket 510, intermittent pressurization to the inner surface 513 of the gasket 510 may cause an air pocket to move to the flow passage 150 side, generating to air bubbles in the fluid. However, the gasket 510 is arranged so that the gap between the upper surface 511 of the gasket 510 and the upper retaining surface 121 of the seal holding part 120 and the gap between the lower surface 512 of the gasket 510 and the lower retaining surface 122 of the seal holding part 120 are communicated with each other through the slits 516. The mating surfaces of the flow-passage block 1101 and the body 1121 are communicated to the outside, so that the air pocket generated between the gasket 510 and the seal holding part 120 is automatically released to outside air through the mating surfaces of the flow-passage block 1101 and the body 1121. Thus, the air in the air pockets between the upper surface 511 and the upper retaining surface 121 and between the lower surface 512 and the lower retaining surface 122 is unlikely to move to the flow passage 150 side, thus preventing air bubbles from becoming generated in the fluid.

Furthermore, the tapered inner surface 513 is transformed into a cylindrical shape when the engagement portions 515 are inserted in the seal holding groove of the body 1121, and thus the gasket 510 is fitted in the seal holding part 120. When the gasket 510 is fitted in a sealing state in the seal holding part 120, the inner surface 513 becomes smoothly curved to be outward convex. The open end of the inner surface 513 on the upper surface side is placed on an open end of the upper retaining surface 121 and the open end of the inner surface 513 on the lower surface side is placed on an open end of the lower retaining surface 122. In other words, the gasket 510 of which the inner surface 513 is continuous to the flow surface 151 is unlikely to generate a gap with respect to the open end of the seal holding part 120.

According to the seal structure 501 of the present embodiment, the gasket 510 having the above configuration is fitted in the seal holding part 120, the ends of the upper surface 511 and the lower surface 512 of the gasket 510 on the inner surface side hermetically close the open end of the seal holding part 120, preventing the fluid from entering between the gasket 510 and the upper retaining surface 121 and the lower retaining surface 122 of the seal holding part 120. Accordingly, the stagnation area and the accumulation area are hardly generated. This seal structure 501 supports, by the outer surface 514 of the gasket 510 and the circumferential surface 123 of the seal holding part 120, the pressure acting on the inner surface 513. Accordingly, the rigidity of the gasket 510 can be enhanced. Even when the high-pressure fluid pressurizes the inner surface 513 of the gasket 510, for instance, the sealing surfaces will not be displaced. Since the gasket 510 is made of a single material, a material cost and a processing cost are inexpensive. Consequently, the seal structure 510 using the inexpensive gasket 501 can offer stable sealing performance, so that the stagnation area and the accumulation area are not generated.

In the seal structure 501 of the present embodiment, the ends of the upper surface 511 and the lower surface 512 on the inner surface side are outermost in the axial direction. When the gasket 510 fitted in the seal holding part 120 is in a sealing state, the ends of the upper surface 511 and the lower surface 512 on the inner surface side are pressed against the ends of the upper retaining surface 121 and the lower retaining surface 122 on the flow passage side, thereby sealing them. This makes it possible to allow smooth flow of the liquid across the contiguous area where the upper retaining surface 121 and the lower retaining surface 122 of the seal holding part 120 are connected with the inner surface 513 of the gasket 510, without generating stagnation.

In the seal structure of the present embodiment, the gasket 510 is arranged such that the upper surface 511 and the lower surface 512 have the flat sealing surfaces 511a and 512a whereby sealing with respect to the upper retaining surface 121 and the lower retaining surface 122. When the portion of the gasket 510 on the upper surface 511 side is inserted in the seal holding part 120 while the engagement portions 515 are pressed, and the gasket 510 is turned to move the end on the upper surface 511 side inwardly, part of the sealing surface 511a of the upper surface 511 is pressed against the upper retaining surface 121 of the seal holding part 120, placing the end of the upper surface 121 on the inner surface side in noncontact with the upper retaining surface 121 of the seal holding part 120. When the portion of the gasket 510 on the lower surface 121 side is inserted in the seal holding part 120 and thus the gasket 510 is fitted in the seal holding part 120, the ends of the upper surface 511 and the lower surface 512 on the inner surface side can be pressed vertically against the upper retaining surface 121 and the lower retaining surface 122 of the seal holding part 120, thereby efficiently developing a sealing force.

In the seal structure 501 of the present embodiment, the gasket 510 is provided with the slits 516 between the engagement portions 515. Through these slits 516, the gap formed between the upper surface 511 of the gasket 510 and the upper retaining surface 121 of the seal holding part 120 and the gap formed between the lower surface 512 of the gasket 510 and the lower retaining surface 122 of the seal holding part 120 are communicated with each other and further communicated to the outside air through the mating surfaces of the flow-passage block 1101 and the body 1121. This makes it possible to automatically release the air in the air pocket formed between the gasket 510 and the seal holding part 120 to the outside, which prevents the air from moving to the flow passage 150 side to cause air bubbles.

Further, the integrated valve 1001 and the fluid device 1102, provided with the seal structure 501 of the present embodiment using the inexpensive gasket 510 having high pressure resistance in each sealing part, can achieve a reduction in generation of fluid stagnation areas and accumulation areas and also a reduction in cost.

The present invention is not limited to the above embodiments and may be embodied in other specific forms without departing from the essential characteristics thereof.

In the first embodiment, the inner surface 114 of the packing 110 is formed in a curved, concave surface, but may be formed as an angularly recessed surface including an upper and lower flat surfaces sloping at a large angle with each other.

For instance, the flow-passage block 1101, body 1121, first and second flow-passage blocks 302 and 303 in the above embodiments are made of resin, but may alternatively be made of metal such as SUS.

In the third and fourth embodiments, for example, the inner surfaces 318 of the gaskets 310 and 410 are flat, but may be curved outward. In this case, the portion joining the upper surface 316 or the lower surface 317 with the inner surface has to be formed in a sharply angled shape whose end is brought in contact with the first or second flow passage 304 and 306 when the gasket is fitted in the first and second gasket recesses 305 and 307, thereby preventing the generation of stagnation areas and the reduction in sealing performance. It is also possible to reduce the material of the rubber part to achieve a reduction in cost.

In the aforementioned third embodiment, the core part 311 is of an annular shape. Alternatively, arcuate core parts may be arranged at regular intervals along the circumference of the rubber part 312 to receive the pressure acting on the inner surface 318.

Figure 23:
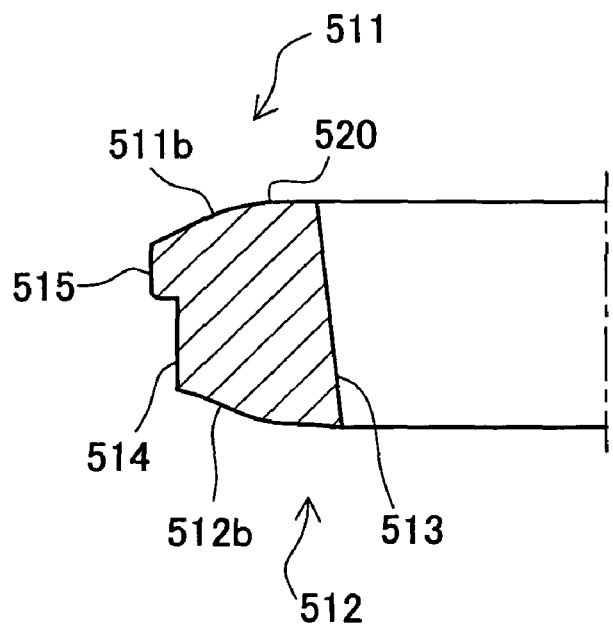
FIG. 23 is a view of a first modified example of the gasket.
Figure 24:
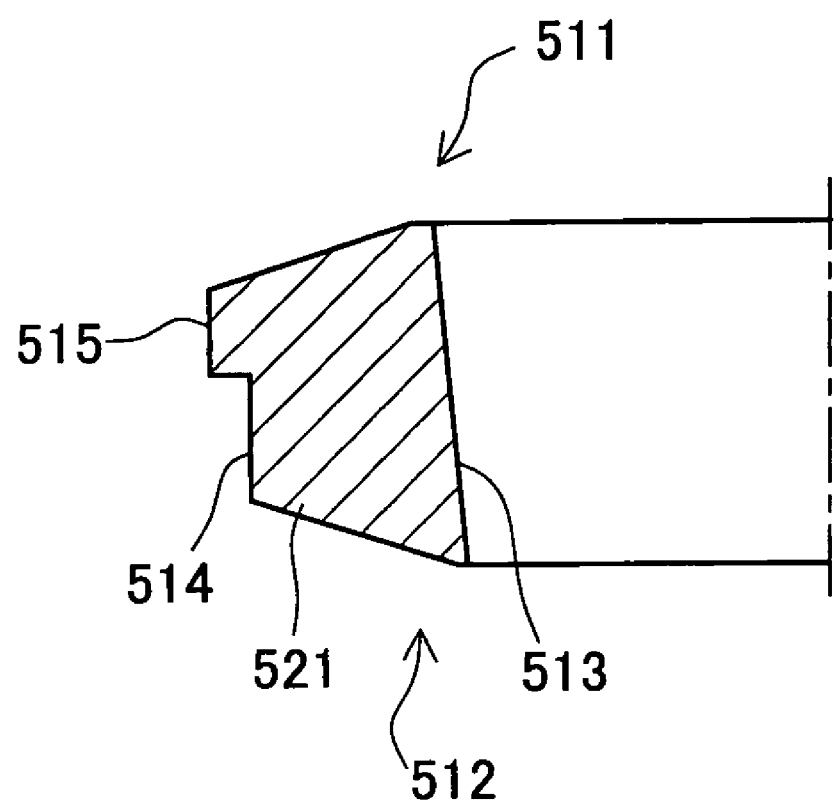
FIG. 24 is a view of a second modified example of the gasket.

For instance, the gasket 510 is provided with the flat sealing surfaces 511a and 512a in the upper and lower surfaces 511 and 512. Alternatively, a curved sealing surface 520 may be provided in the upper and lower surfaces 511 and 512 as shown in FIG. 23 and a tapered sealing surface 521 may be provided in the upper and lower surfaces 511 and 512 as shown in FIG. 24. For instance, the slits 516 of the fifth embodiment are formed by circumferentially cutting. Alternatively, slits may be formed by punching out the engagement portion to form through holes.

In the aforementioned embodiments, for instance, the seal structure is arranged in the sealing part between the flow-passage block 1101 and the body 1121 of the fluid device 1102. Alternatively, the seal structure in each embodiment may be arranged in the sealing part between flow-passage blocks or pipes.

In the aforementioned embodiments, for instance, the sealing members are the packing or the gasket that is made of elastically deformable rubber or plastic-deformable resin, but may be a metallic packing or gasket.

For instance, the above embodiments are explained with a focus on the seal structures. Those seal structures are characterized in the sealing members such as the packing 110, and the gaskets 310 and 510. In the seal structure in which the sealing member is mounted, the shape or others of the sealing member could not be specified unless the flow-passage members (the flow-passage block 1101, body 1121, first flow-passage block 302, second flow-passage block 303, etc.) are disassembled. Hence applicants request to obtain patent rights to the sealing member as well as the seal structure. It therefore should be understood that the sealing member substantially has the same operations and effects as the seal structure.

The invention claimed is:

1. A seal structure comprising an annular seal holding part formed in a joining portion of flow passages in fluid members connected at open ends thereof, and a sealing member held in an elastically deformed state between the fluid members and fitted in the seal holding part to hermetically seal the flow passage joining portion, the seal holding part is formed to open inwardly into the flow passage and include a first retaining surface, a second retaining surface, and a circumferential retaining surface, and the sealing member comprises:

a first surface in contact with the first retaining surface;

a second surface in contact with the second retaining surface;

an inner surface joining inner edges of the first surface and the second surface, the inner surface being formed with a taper to having a diameter becoming smaller from the first surface to the second surface when the sealing member is in an uninstalled state;

ends of the first surface and the second surface on an inner surface side are located at ends of the first retaining surface and the second retaining surface on the flow passage side; and an outer surface joining outer edges of the first surface and the second surface, the inner surface forming a flow passage inner wall having a concave shape, and the outer surface is formed with an engagement portion sized and shaped that the engagement portion is tightly held in the seal holding part and protrudes outwardly and close to the first surface, the engagement portion being formed with slits at circumferentially regular intervals.

2. The seal structure according to claim 1, wherein the taper has an inclination width determined to be almost equal to a protruding width of the engagement portion so that the inner edge of the inner surface is aligned with an end of the seal holding part on a flow passage side.

3. The seal structure according to claim 1, wherein the ends of the first surface and the second surface on the inner surface side are outermost in an axial direction.

4. The seal structure according to claim 1, wherein the sealing member includes a sealing surface of one of a flat, tapered, and curved forms that seal the first surface with the first retaining surface and the second surface with the second retaining surface.

* * * * *